US010826199B2

(12) United States Patent
Fenn et al.

(10) Patent No.: US 10,826,199 B2
(45) Date of Patent: *Nov. 3, 2020

(54) MULTIPOLARIZED VECTOR SENSOR ARRAY ANTENNA SYSTEM FOR RADIO ASTRONOMY APPLICATIONS

(71) Applicant: Massachusetts Institute Of Technology, Cambridge, MA (US)

(72) Inventors: Alan J. Fenn, Wayland, MA (US); Frank C. Robey, Concord, MA (US); Peter T. Hurst, Cambridge, MA (US); Mark J. Silver, Bedford, MA (US); Joseph M. D'Arco, Chelsea, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 58 days.

This patent is subject to a terminal disclaimer.

(21) Appl. No.: 16/274,675

(22) Filed: Feb. 13, 2019

(65) Prior Publication Data

US 2019/0181566 A1 Jun. 13, 2019

Related U.S. Application Data

(63) Continuation of application No. 15/297,220, filed on Oct. 19, 2016, now Pat. No. 10,283,877.
(Continued)

(51) Int. Cl.
*H01Q 1/14* (2006.01)
*H01Q 21/24* (2006.01)
(Continued)

(52) U.S. Cl.
CPC ............ *H01Q 25/04* (2013.01); *G01S 3/143* (2013.01); *G01S 3/18* (2013.01); *H01Q 1/14* (2013.01);
(Continued)

(58) Field of Classification Search
CPC ........ B64G 1/222; H01Q 1/14; H01Q 1/1235; H01Q 1/288; G01S 3/143
See application file for complete search history.

(56) References Cited

U.S. PATENT DOCUMENTS 4,121,216 A * 10/1978 Bunch ...................... G01S 3/32
342/424
5,101,214 A 3/1992 Ohtsuka et al.
(Continued)

OTHER PUBLICATIONS

International Search Report and Written Opinion dated Mar. 27, 2017 in corresponding PCT application No. PCT/US16/57588.
(Continued)

*Primary Examiner* — Ricardo I Magallanes
(74) *Attorney, Agent, or Firm* — Nields, Lemack & Frame, LLC

(57) ABSTRACT

The present invention generally relates to an electromagnetic field vector sensing receive antenna array system for installation and deployment on a structure. A multipolarized array of collocated antenna elements is used to provide calibrated amplitude and phase radiation patterns with monopole, dipole, and loop modes generated from crossed loops connected to a beamformer. The invention has applications for installation and deployment on a tower, balloon, satellite for radio frequency sensing and location of low-frequency galactic emissions. The novel receive antenna array system comprises a multipolarized vector sensor antenna array. The disclosed direction-finding vector sensor can be installed and deployed on a structure and can detect and locate radio frequency emissions from galactic sources. The key system components of the receive antenna array system consist of deployable antennas, receivers, signal processing computer, and communications link.

19 Claims, 33 Drawing Sheets

Related U.S. Application Data

(60) Provisional application No. 62/243,343, filed on Oct. 19, 2015.

(51) Int. Cl.

| | | |
|---|---|---|
| *H01Q 21/29* | (2006.01) | |
| *H01Q 7/02* | (2006.01) | |
| *H01Q 7/00* | (2006.01) | |
| *H01Q 25/04* | (2006.01) | |
| *G01S 3/14* | (2006.01) | |
| *G01S 3/18* | (2006.01) | |
| *H01Q 5/48* | (2015.01) | |
| *H01Q 1/28* | (2006.01) | |
| *H04B 7/06* | (2006.01) | |
| *H04B 7/08* | (2006.01) | |

(52) U.S. Cl.
CPC ............... *H01Q 1/288* (2013.01); *H01Q 5/48* (2015.01); *H01Q 7/02* (2013.01); *H01Q 21/24* (2013.01); *H01Q 21/245* (2013.01); *H01Q 21/29* (2013.01); *H04B 7/0617* (2013.01); *H04B 7/0885* (2013.01); *H01Q 7/005* (2013.01)

(56) References Cited

U.S. PATENT DOCUMENTS

| | | | |
|---|---|---|---|
| 5,300,885 | A | 4/1994 | Bull |
| 10,283,877 | B2 | 5/2019 | Fenn et al. |
| 2006/0158374 | A1 | 7/2006 | Rahamim et al. |
| 2007/0224948 | A1 | 9/2007 | Hartenstein et al. |
| 2009/0096691 | A1 | 4/2009 | Apostolos |
| 2010/0103052 | A1 | 4/2010 | Ying |
| 2012/0329407 | A1 | 12/2012 | Rousu et al. |
| 2014/0145888 | A1* | 5/2014 | Mertel ............... H01Q 1/1235 343/723 |
| 2014/0263844 | A1* | 9/2014 | Cook, Jr. ............... B64G 1/44 244/164 |
| 2014/0266888 | A1 | 9/2014 | Parent et al. |
| 2015/0372374 | A1* | 12/2015 | Judd ............... H01Q 1/362 244/172.6 |
| 2017/0229787 | A1 | 8/2017 | Fenn et al. |
| 2017/0310013 | A1 | 10/2017 | Muesse et al. |

OTHER PUBLICATIONS

Appadwedula et al., "Direction-Finding Results for a Vector Sensor Antenna on a Small UAV," Proc. IEEE Workshop on Sensor Array and Multichannel Signal Proc., Jul. 2006, pp. 74-78.

Blackwell, "The MicroMAS and MiRaTA CubeSat Atmospheric Profiling Missions," in Microwave Symposium (IMS), 2015 IEEE MTT-S International, pp. 17-22, May 2015.

Cohen et al., "The VLA Low-Frequency Sky Survey," The Astronomical Journal, vol. 134, Sep. 2007, pp. 1245-1262.

Costantine et al., "CubeSat Deployable Antenna Using Bistable Composite Tape-Springs, Antennas and Wireless Propagation Letters," IEEE, vol. 11, 2012, pp. 285-288.

Jester et al., "Science with a Lunar Low-Frequency Array: From the Dark Ages of the Universe to Nearby Exoplanets," New Astronomy Reviews, vol. 53, 2009, pp. 1-26.

Kassim et al., "The 74 MHz System on the Very Large Array," The Astrophysical Journal Supplement Series, vol. 172, Oct. 2007, pp. 686-719.

Lane et al., "The Very Large Array Low-Frequency Sky Survey Redux (VLSSr)," Monthly Notices of the Royal Astronomical Society, Apr. 4, 2014, Accessed online: http://arxiv.org/pdf/1404.0694v1.pdf.

Lehmensiek et al., "The Design of an HF Antenna for a 1U CubeSat," Africon, Sep. 9-12, 2013, pp. 1-5.

Mir et al., "Calibration of a Polarization Diverse Array," International Conf. on Acous. Speech and Sig Proc, May 2006, pp. 1065-1068.

Mir et al., "Passive Direction Finding Using Airborne Vector Sensors in the Presence of Manifold Perturbations," IEEE Trans. Sig. Proc., vol. 55, pp. 156-164, Jan. 2007.

Mir, "Transfer Function Based Approaches to Array Calibration," Journal of Communications, May 2007, vol. 2, No. 3, pp. 58-63.

Niehorai et al., "Vector-Sensor Array Processing for Electromagnetic Source Localization," IEEE Trans. Signal Proc., Feb. 1994, vol. A2, pp. 376-398.

Roybal et al., "Development of an Elastically Deployable Boom for Tensioned Planar Structures," 48th AIAAASMEASCEAHSASC Structures Structural Dynamics and Materials Conference, 2007.

Schmidt, "Multiple Emitter Location and Signal Parameter Estimation," IEEE Transactions on Antennas and Propagation, 1986, vol. 34, No. 3, pp. 276-280.

Seffen et al., "Deployment Dynamics of Tape Springs," In Proceedings of the Royal Society of London A: Mathematical, Physical, and Engineering Sciences, vol. A55, No. 1983, pp. 1003-1048, The Royal Society, 1999.

Waydo et al., "CubeSat Design for LEO-Based Earth Science Missions," in Aerospace Conference Proceedings, 2002, IEEE, vol. 1, pp. 435-445.

\* cited by examiner

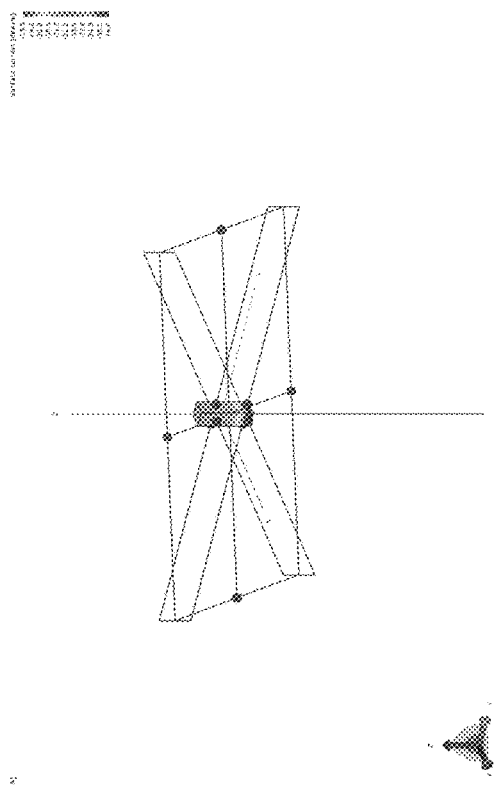
FIG. 19

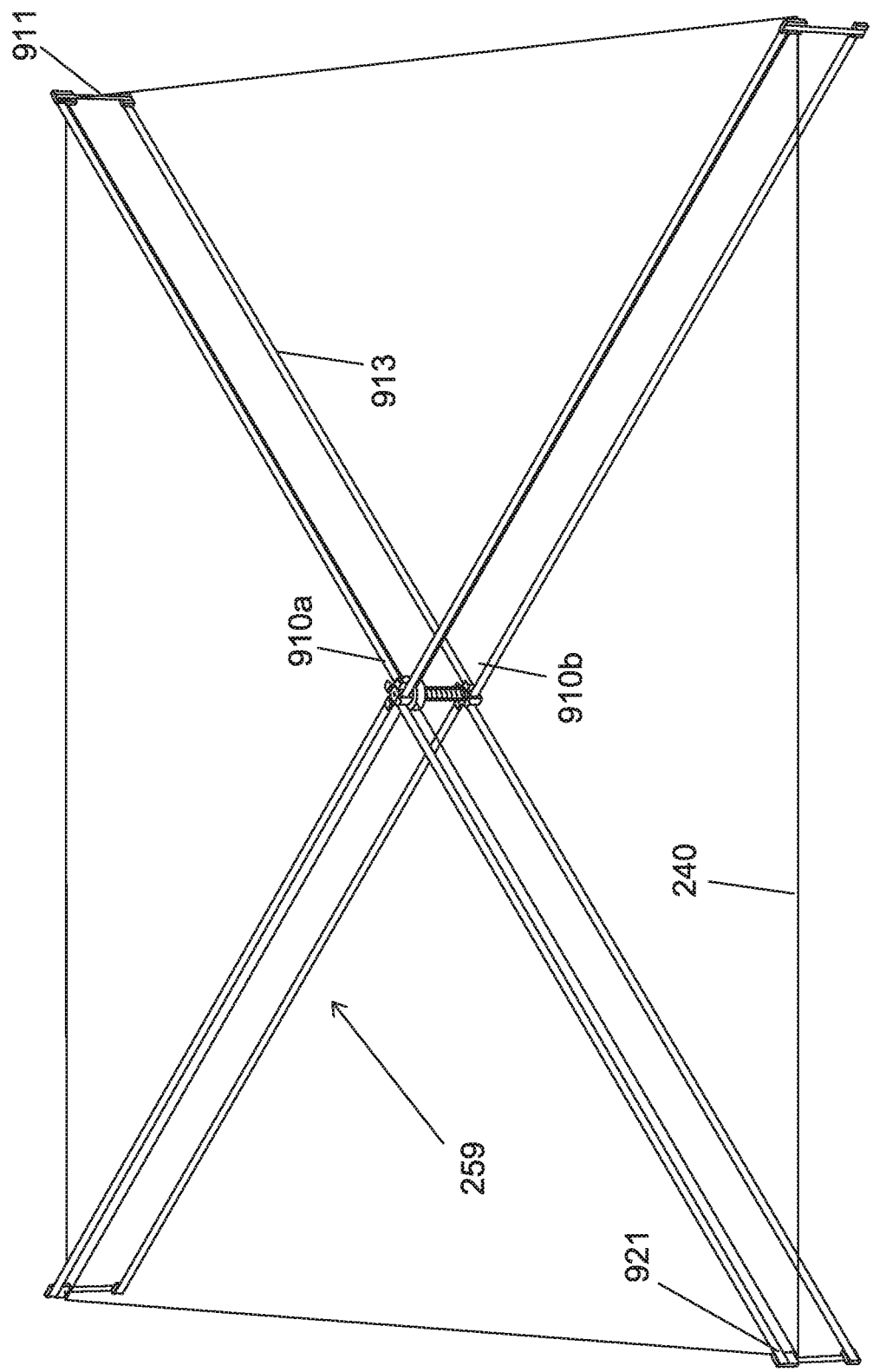

MULTIPOLARIZED VECTOR SENSOR ARRAY ANTENNA SYSTEM FOR RADIO ASTRONOMY APPLICATIONS

This application is a continuation of U.S. patent application Ser. No. 15/297,220, filed Oct. 19, 2016, which claims priority of U.S. Provisional Patent Application Ser. No. 62/243,343, filed Oct. 19, 2015, the disclosures of which are incorporated herein by reference in their entireties.

This invention was made with government support under Grant No. FA8721-05-C-0002 awarded by the U.S. Air Force. The government has certain rights in the invention.

BACKGROUND OF THE INVENTION

It is well known that mapping of radio frequency galactic noise-like sources can be determined by ground based large diameter antenna array measurements for frequencies above about 25 MHz. Due to the total electron content of the ionosphere, radio frequency sources radiating below about 25 MHz are partially or almost completely reflected by the ionosphere. Therefore, the electromagnetic waves from galactic radio frequency sources are partially or almost completely blocked by the earth's ionosphere up to an altitude of about 300 km. Terrestrial radio frequency emissions are a significant source of interference for ground-based low-frequency mapping sensors. The natural radio frequency shielding provided by the ionosphere reduces terrestrial interference that would be received by a low-frequency satellite sensor orbiting above the ionosphere. Thus, mapping of galactic RF sources below 25 MHz can best be accomplished from a spacecraft above 300 km altitude. Multipolarized vector sensor antenna systems are being explored for a variety of direction finding applications and these sensors, when deployed in orbit above the ionosphere, are an alternate approach to mapping galactic sources.

Curved thin shells, often called tapes, have been used to deploy structures and antenna in space for some time. They are used in many antenna concepts because they roll up or fold very compactly and after they deploy, they provide structural stiffness. In articular, metal tapes are often used as monopole antennas on cubesats. Common metal carpenters tapes well suited for cubesat antennas because they are conductive metal and are very inexpensive.

It would be beneficial if there were a system which can be deployed in a tower, balloon, or satellite for radio frequency sensing and location of low-frequency galactic emissions. Further, it would be advantageous if this system could be stowed during launch and deploy while in orbit.

SUMMARY OF THE INVENTION

The present invention generally relates to an electromagnetic field vector sensing receive antenna array system for installation and deployment on a structure. A multipolarized array of collocated antenna elements is used to provide calibrated amplitude and phase radiation patterns with monopole, dipole, and loop modes generated from crossed loops connected to a beamformer. The invention has applications for installation and deployment on a tower, balloon, or satellite for radio frequency sensing and location of low-frequency galactic emissions.

More specifically, the novel receive antenna array system comprises a multipolarized vector sensor antenna array. The disclosed direction-finding vector sensor can be installed and deployed on a structure and can detect and locate radio frequency emissions from galactic sources. The key system components of the receive antenna array system consist of deployable antennas, receivers, signal processing computer, and communications link.

There are multiple unique aspects of the invention. One is the approach to generating the loop and dipole modes from a mix of dual mode elements and a multiple feedpoint air loop. A second unique aspect is that the antenna is stowed during launch and then deployed once in orbit. The vector sensor antenna system disclosed here can also be installed on a tower or balloon and used to map radio sources at frequencies above about 25 MHz where the ionospheric shielding is reduced.

BRIEF DESCRIPTION OF THE DRAWINGS

For a better understanding of the present disclosure, reference is made to the accompanying drawings, in which like elements are referenced with like numerals, and in which:

FIG. 19 shows simulated current distributions for the monopole and horizontal loop modes.

FIG. 26A shows the stowed position and FIG. 26B shows the deployed position.

FIGS. 29A-29C show the telescoping hub mechanism and vector sensor array according to one embodiment.

LIST OF TABLES

TABLE 1 lists the input impedance versus frequency for the vector sensor dipole mode.

TABLE 2 lists the input impedance versus frequency for the vector sensor vertical loop mode.

TABLE 3 lists the input impedance versus frequency for the vector sensor monopole mode.

TABLE 4 lists the input impedance versus frequency for the vector sensor horizontal loop mode.

DETAILED DESCRIPTION

Figure 1:
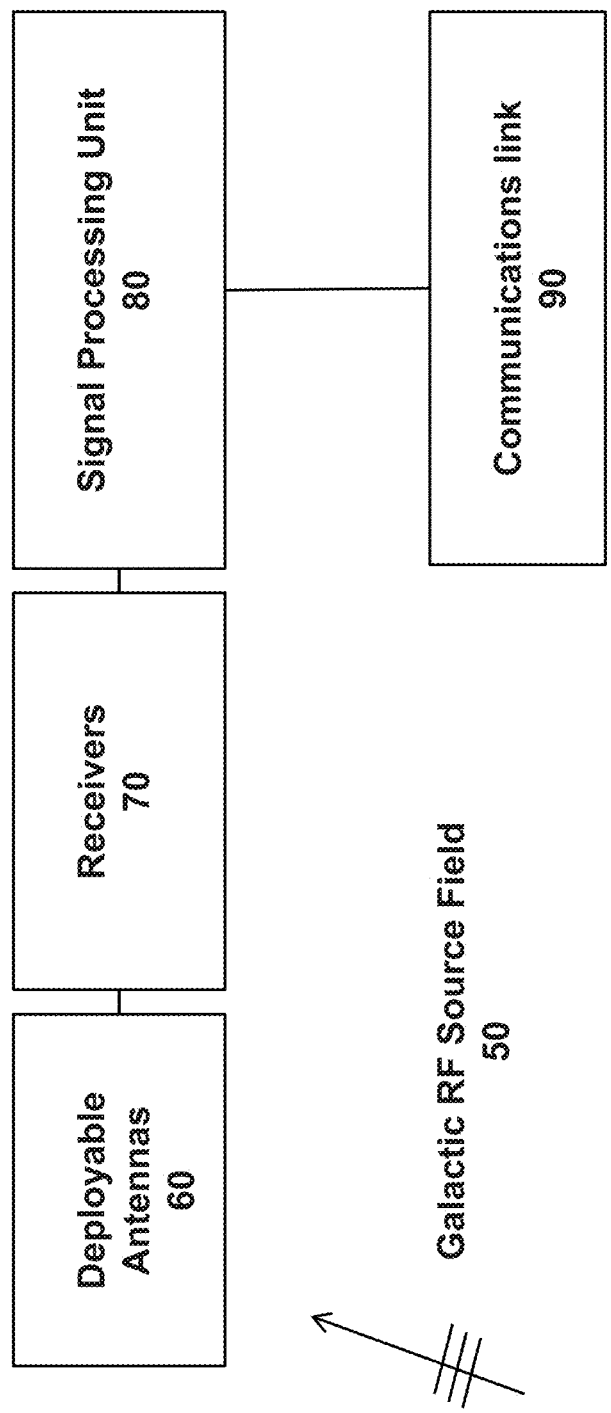
FIG. 1 is a schematic diagram showing the key components of the direction finding RF vector sensor system including deployable antennas, receivers, signal processing and a communications link.

FIG. 1 illustrates a novel receive array antenna system designed for mapping of galactic radio frequency electromagnetic fields 50. The electrical system includes deployable antennas 60, receivers 70, an onboard signal processing unit 80, and a downlink system 90 to communicate the received data to a ground station (not shown). The system comprises a multipolarized antenna array with up to six co-located antenna elements, multichannel digital receiver, and a signal processing unit. The signal processing unit 80 may comprise a computer or other controller having a processing unit and an associated memory device. The memory device, which may be volatile or non-volatile, may contain the instructions which, when executed by the processing unit, enable the signal processing unit to perform the functions described herein. As described in more detail below, the antenna array can be installed and deployed on a tower, a balloon or from a satellite such as a cubesat.

In the case of a galactic source, an electromagnetic wave is received by the vector sensing antennas 60, each having calibrated amplitude and phase receive radiation patterns. The antennas 60 are connected by means or radiofrequency coaxial cables, twin lead, or microstrip lines to channels of the digital receiver 70 that filter, down convert, and digitize the received radio frequency wave. A signal processing unit 80 processes the digitized data, and then on-board global positioning system (GPS) and inertial navigation system (INS) data are used as reference position and orientation information in mapping location of the galactic radio frequency source.

Figure 2:
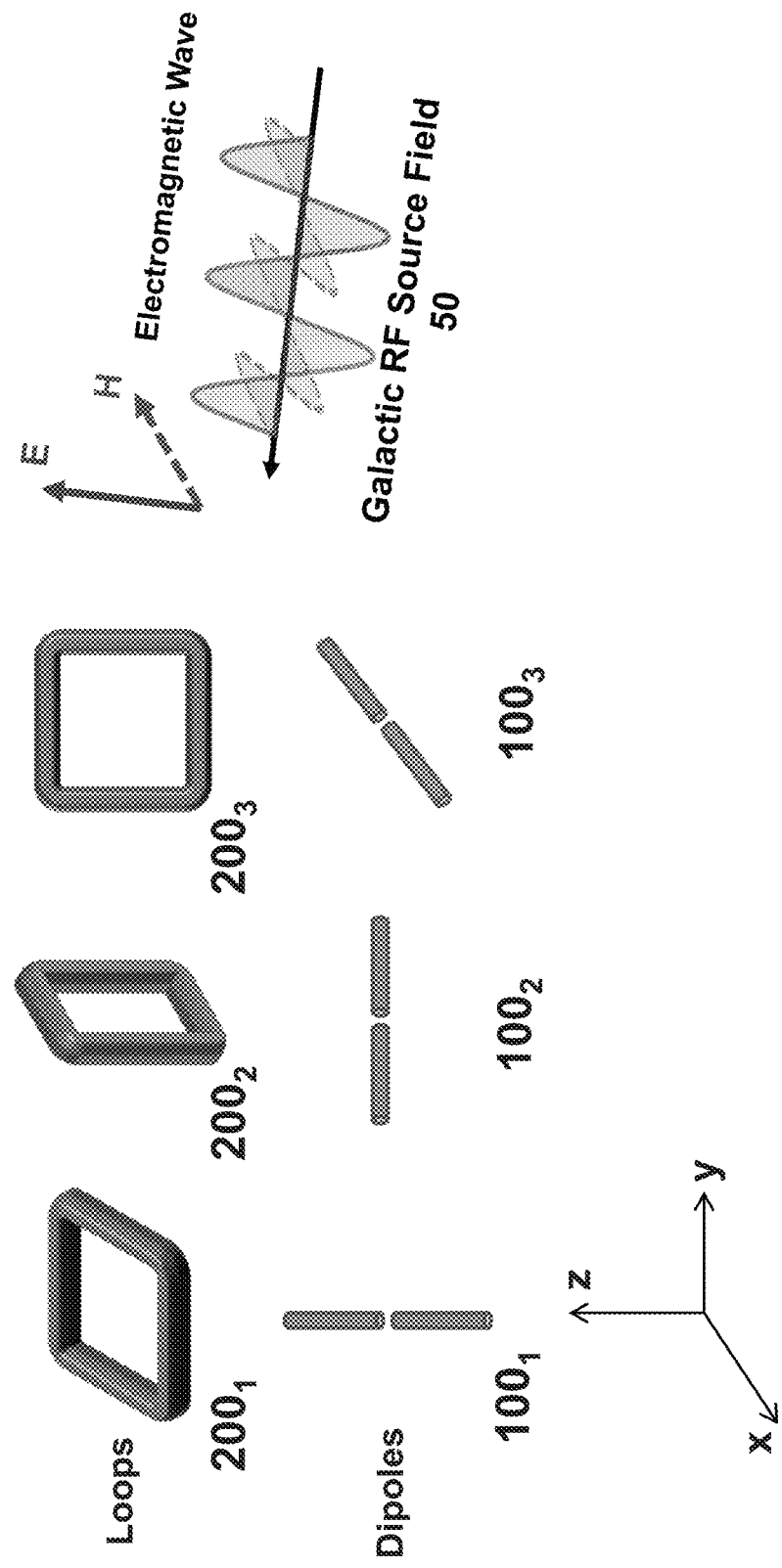
FIG. 2 is a pictorial view of a generally polarized electromagnetic wave from a galactic radio frequency source incident on three orthogonal loop antennas and three orthogonal dipole antennas.

The general case of an electromagnetic wavefront attributed to a galactic radio frequency electromagnetic field 50 incident on a set of antennas including three orthogonal loop modes 200 and three orthogonal dipole modes 100 is shown conceptually in FIG. 2. A dipole consists of two monopole segments, and a monopole over an electrically conducting ground plane has radiation pattern characteristics similar to a dipole. In the system disclosed, the antenna system includes co-located crossed wire, tubular, or metal tape antennas with up to six simultaneous operating modes including two orthogonal directional dipole modes, two orthogonal directional loop modes, an omnidirectional monopole mode, and an omnidirectional loop mode. When a galactic radio frequency electromagnetic field is received, the unique antenna pattern amplitude and phase distributions are effective in forming a signal correlation matrix that contains the galactic wave's direction of arrival information.

Figure 3:
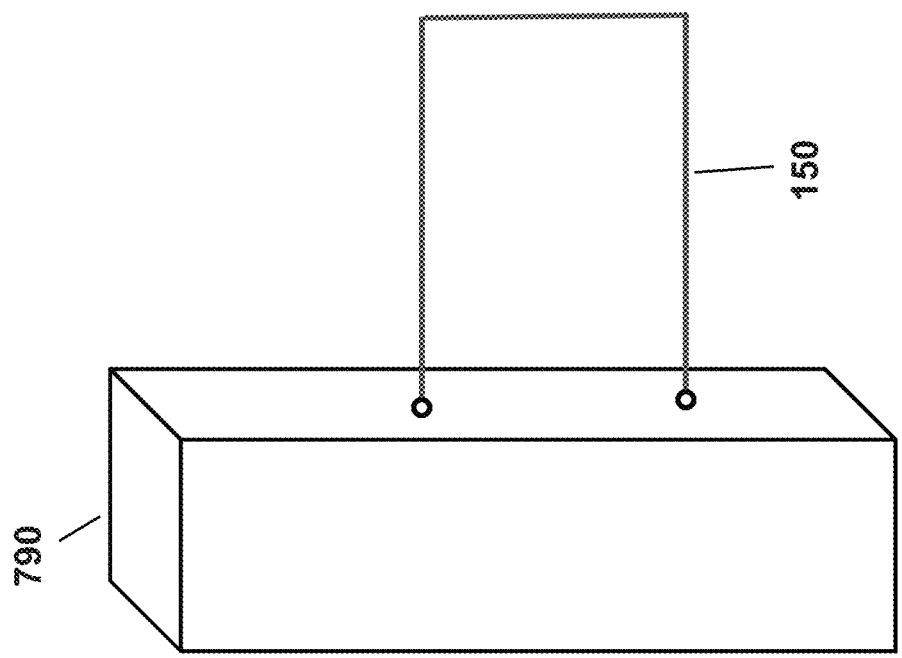
FIG. 3 is a pictorial view of a vector sensor half-loop antenna deployed on the side of an electrically conducting housing.

FIG. 3 shows a pictorial view of a vector sensor half-loop antenna 150 deployed on the side of an electrically conducting housing 790, which can represent a small satellite, sometimes referred to in the literature as a cubesat. A typical cubesat has dimensions 10 cm.×10 cm.×30 cm (also referred to as a 3U cubesat). This half-loop antenna 150 may be used in monopole and loop modes.

Figure 4B:
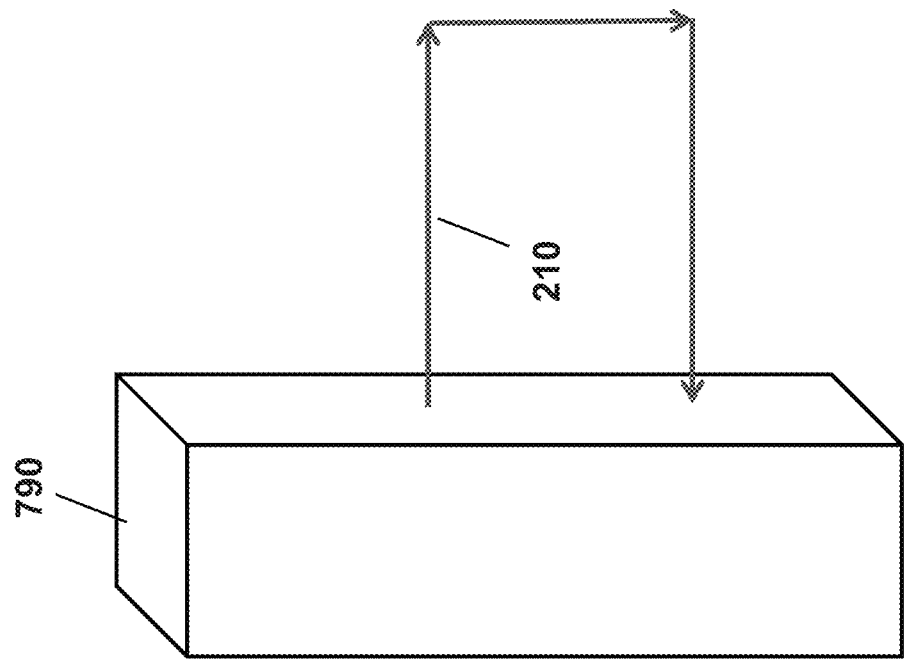
FIG. 4A-4B are pictorial views of vector sensor antennas operating with monopole mode (FIG. 4A) and loop mode (FIG. 4B) deployed on the side of an electrically conducting housing. The arrows represent current flow.
Figure 4A:
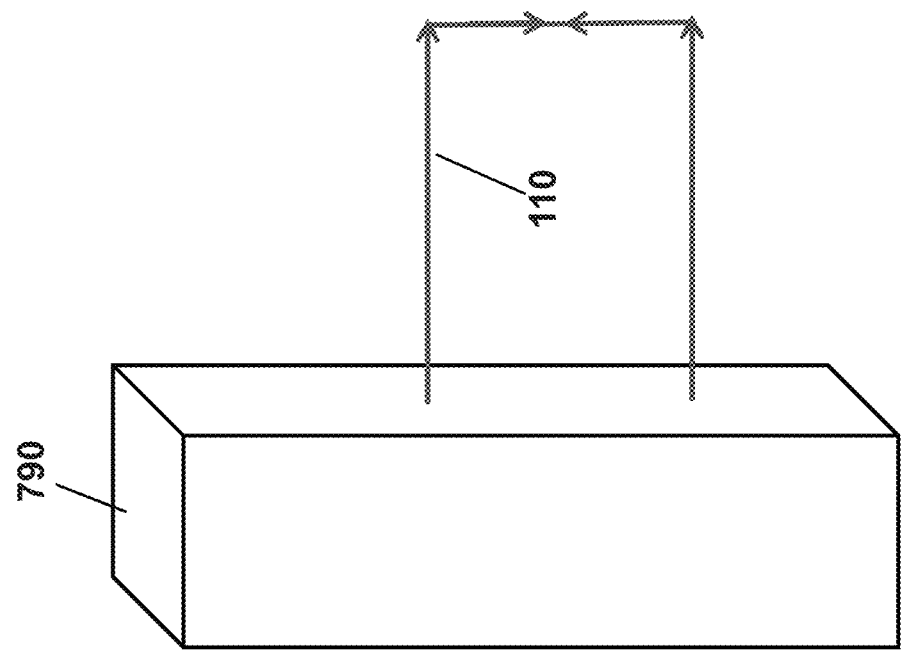

FIGS. 4A-4B show the concepts of monopole modes 110 and loop modes 210 deployed from the side of a cubesat metallic housing 790, respectively. In monopole mode 110, the currents are flowing from the housing 790 in the same direction (i.e. either currents both flow toward housing 790 or away from housing 790). In loop mode 210, the current flows out from one terminal on the housing 790 and returns at the second terminal. These half loops 150 may be combined to form full loops.

Figure 5:
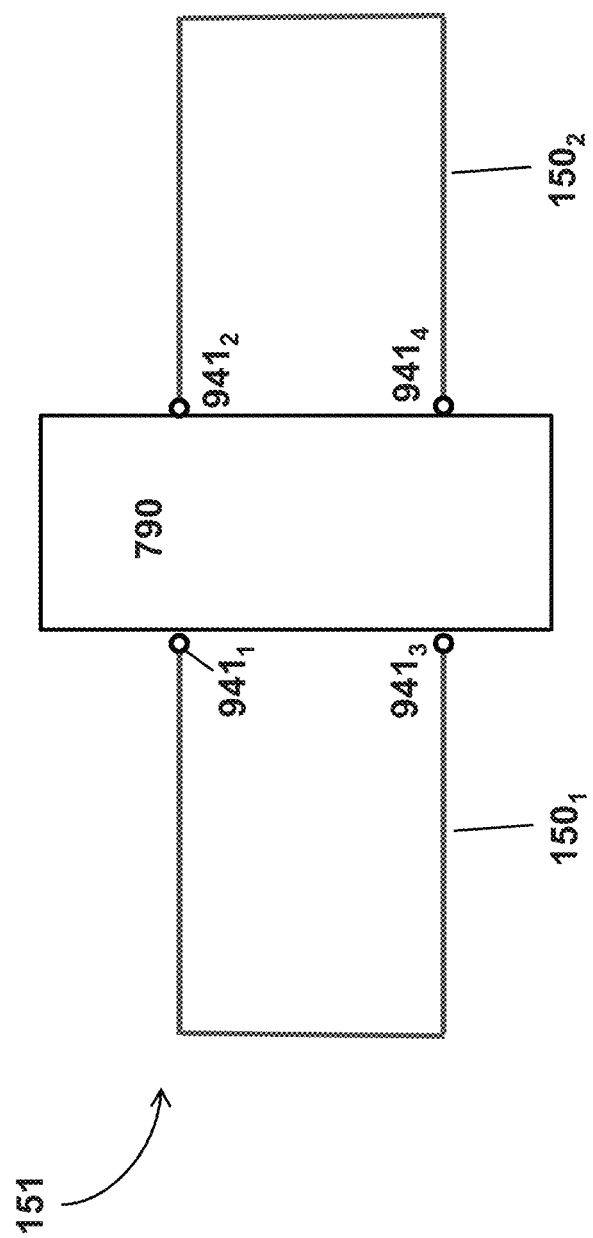
FIG. 5 is a pictorial view of a vector sensor full-loop antenna deployed on opposite sides of an electrically conducting housing.
Figure 6:
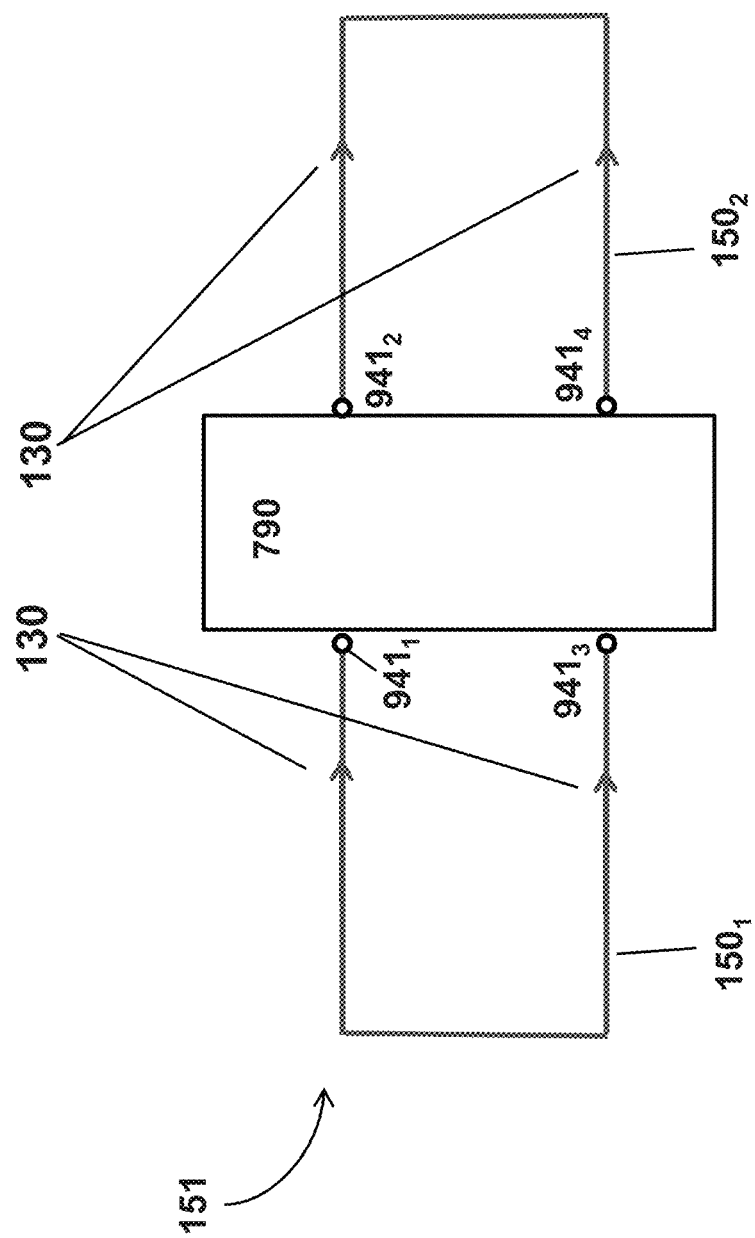
FIG. 6 is a pictorial view of a vector sensor full-loop antenna operating in a dipole mode. The arrows represent current flow.
Figure 7:
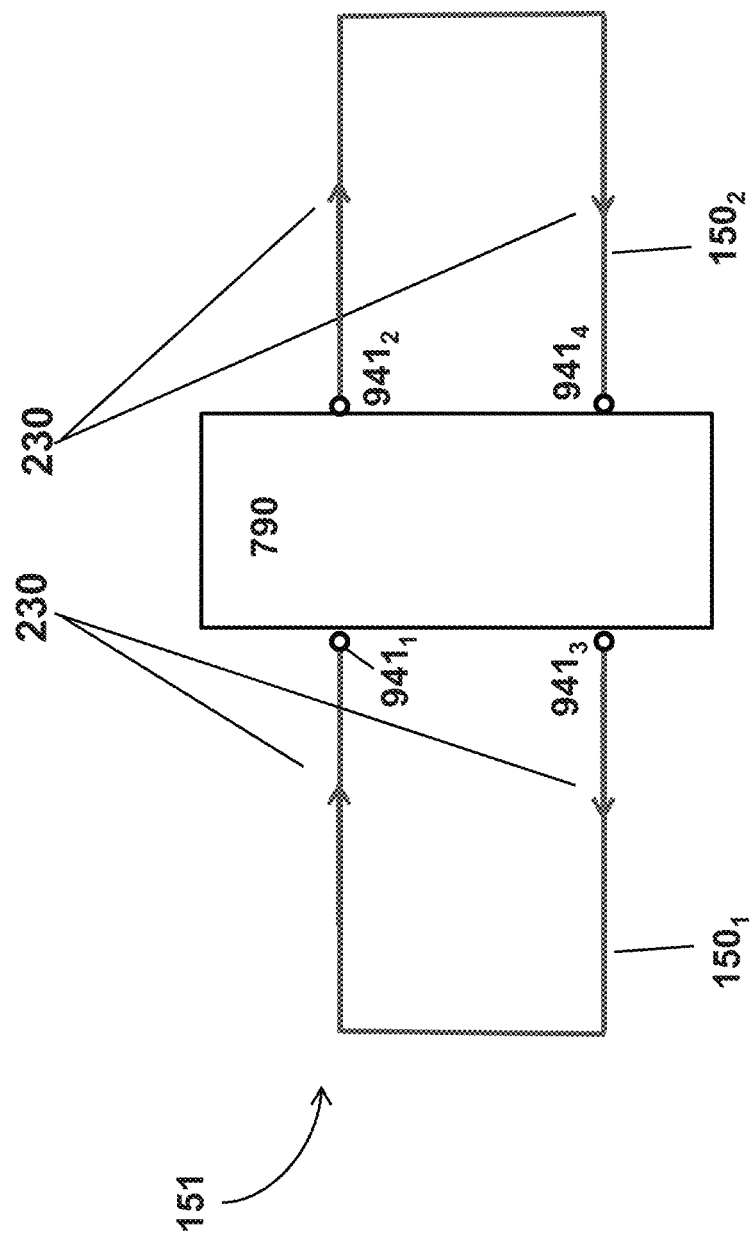
FIG. 7 is a pictorial view of a vector sensor full-loop antenna operating in a loop mode. The arrows represent current flow.

FIG. 5 depicts a full-loop 151 composed of two half-loops $150_1$ and $150_2$, with four ports $941_1$, $941_2$, $941_3$, $941_4$. By adjusting the amplitude and phase relation of the four ports, either a dipole or loop mode can be generated. FIG. 6 is a pictorial view of a vector sensor full-loop 151 operating in the dipole mode 130. FIG. 7 is a pictorial view of a vector sensor full-loop 151 operating in the loop mode 230.

While FIGS. 5-7 show a full loop 151 configured on opposite sides of the housing 790, it is understood that a second full loop may be configured on the remaining opposite sides of the housing 790. This creates a second full loop that is orthogonal to the full loop 151.

Figure 20:
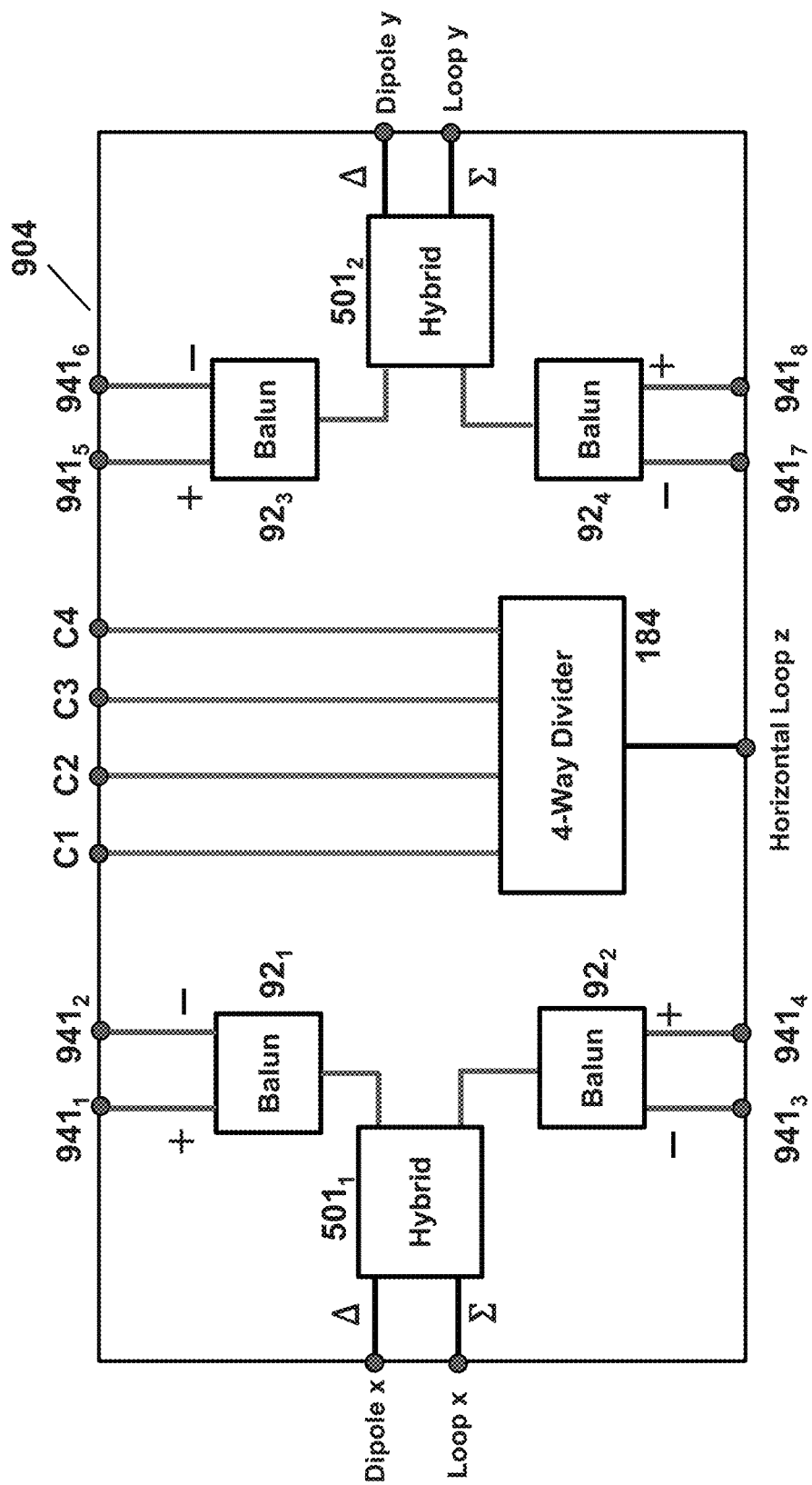
FIG. 20 is a schematic diagram of a vector sensor antenna beamformer in which sum and difference hybrid magic tee components are used to generate dipole and loop modes, and a four-way combiner is used to generate the horizontal loop mode.
Figure 21:
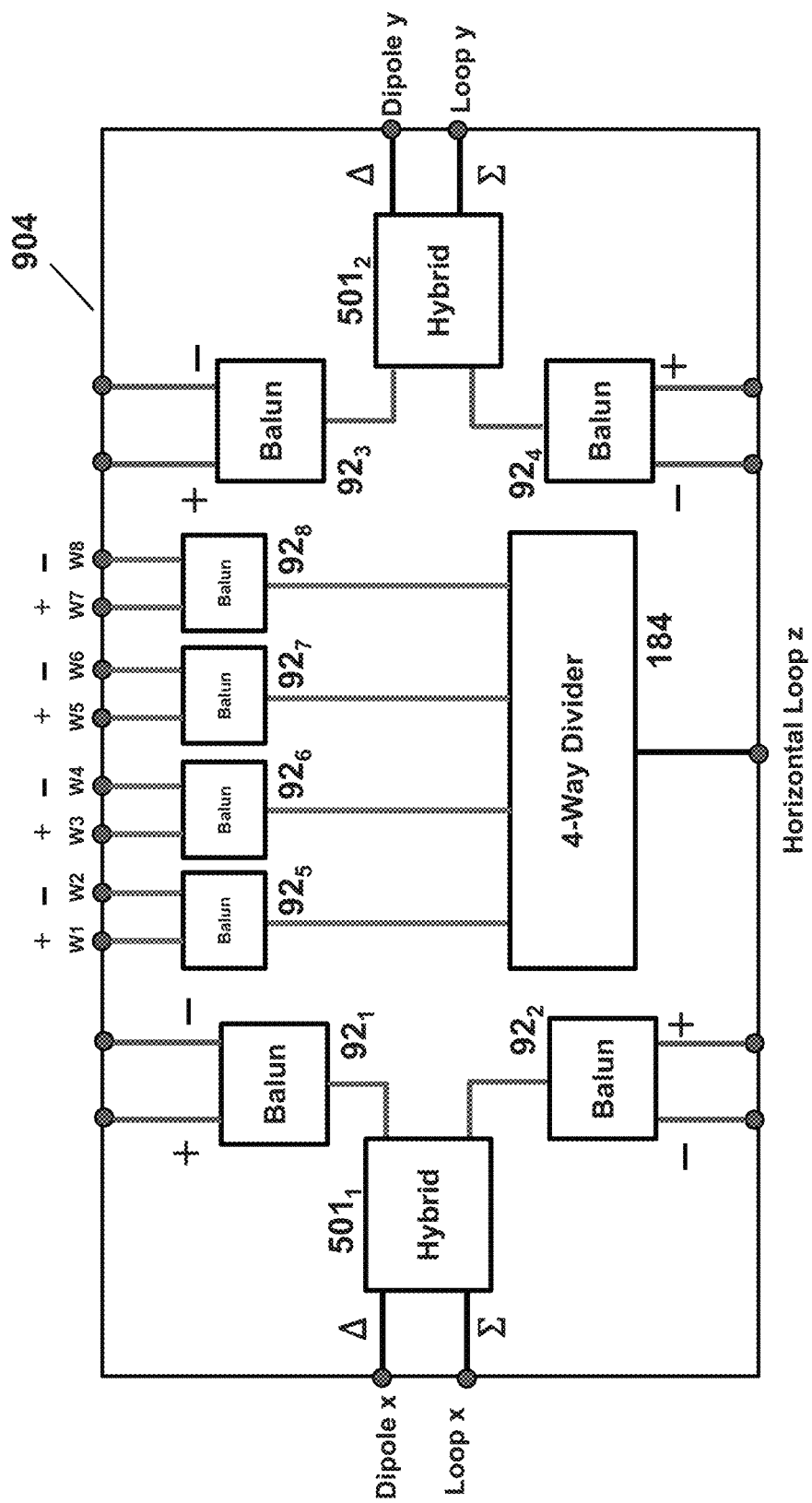
FIG. 21 is a schematic diagram of a vector sensor antenna beamformer in which sum and difference hybrid magic tee components are used to generate dipole and loop modes, and a four-way combiner is used to generate the horizontal loop mode. Compared to FIG. 20, baluns are used to provide a balanced input from the four loop ports.

Importantly, the full loop antenna 151 is created by two half loops 150$_1$ and 150$_2$, with the metallic housing 790 disposed between these two half loops. The electrical connections used to create this full loop are shown in FIGS. 20 and 21 and will be described in detail below.

Figure 8:
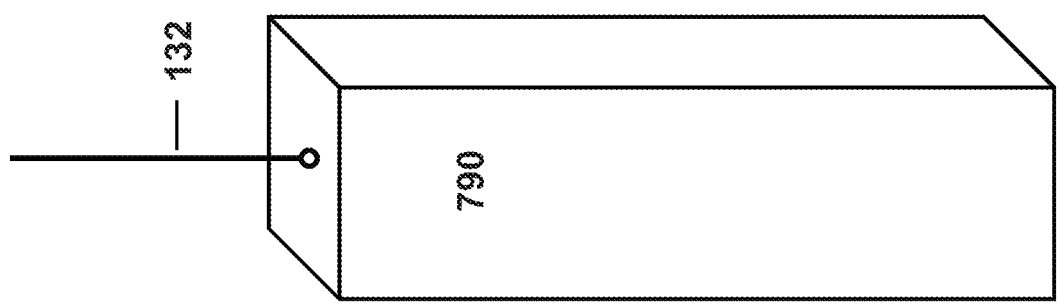
FIG. 8 is a pictorial view of a monopole vector sensor antenna deployed on the end of an electrically conducting housing.
Figure 9:
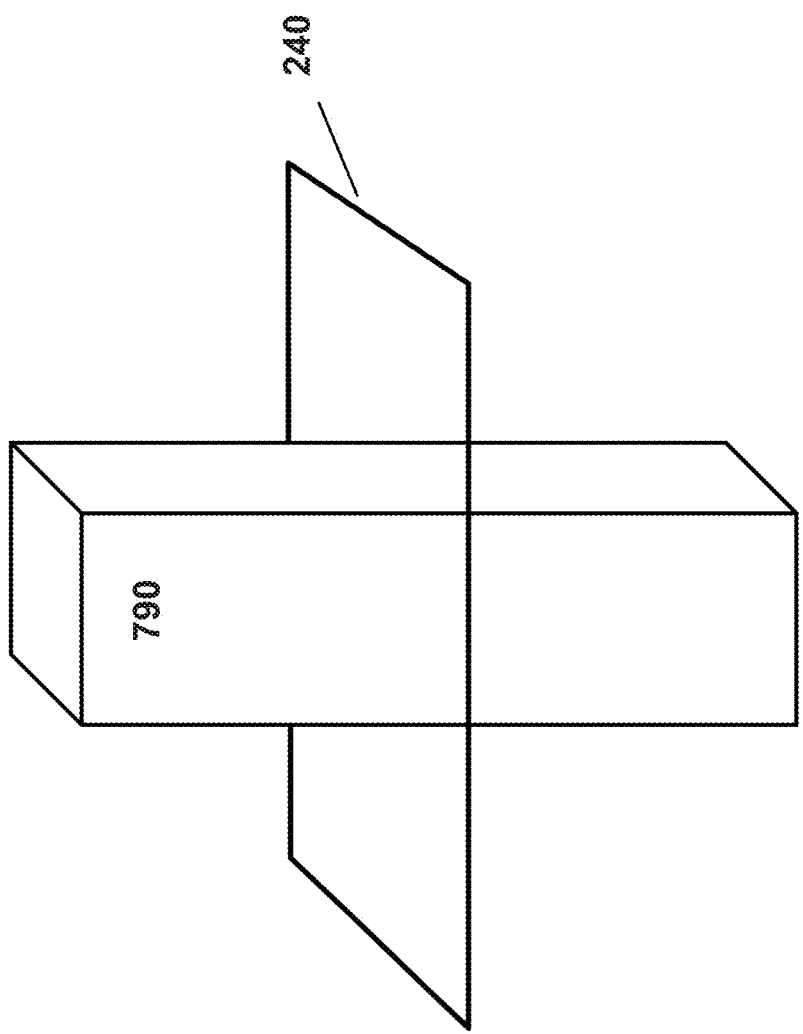
FIG. 9 is a pictorial view of a vector sensing horizontal loop antenna surrounding an electrically conducting housing.

In addition to the loop antennas, monopole and loop antennas may also be deployed on the housing 790. FIG. 8 depicts a monopole antenna 132 deployed from the end of a cubesat housing 790. FIG. 9 shows the concept of a horizontal loop antenna 240 deployed around the perimeter of a cubesat housing 790.

Figure 10:
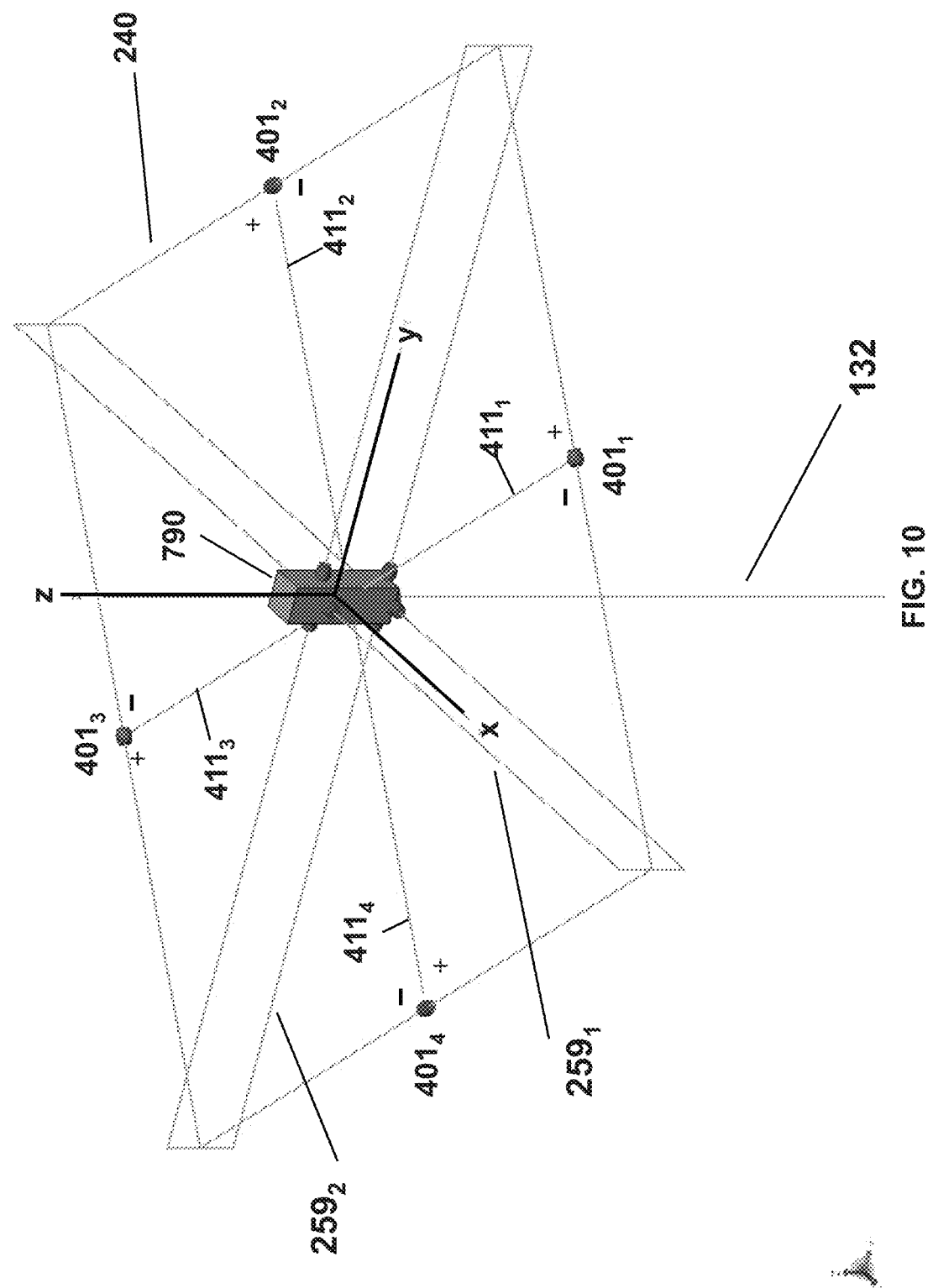
FIG. 10 is a schematic diagram of a full six-mode vector sensor antenna system with feedlines for a horizontal loop mode.

Thus, it is possible to create six modes through the use of crossed loop antennas, a horizontal loop antenna and a monopole antenna. In the preferred embodiment, a full set of vector sensor antenna modes are deployed from a cubesat housing 790, as shown in FIG. 10. In this full vector sensor, there are two crossed loop antennas (loop 259$_1$ oriented with the plane of the loop perpendicular to the y axis, and loop 259$_2$ oriented with the plane of the loop perpendicular to the x axis) operating with dipole and loop modes. Monopole antenna 132 is deployed from the end of cubesat housing 790 in the z direction. Omnidirectional horizontal loop 240 fed with equal amplitude and equal phase at four points 401$_1$, 401$_2$, 401$_3$, 401$_4$ via four feedlines 411$_1$, 411$_2$, 411$_3$, 411$_4$. The polarity ± of the connections to the horizontal loop antenna 240 is indicated. Omnidirectional horizontal loop 240 is electrically isolated from the crossed loop antennas 259$_1$ and 259$_2$, but it may be mechanically connected to the crossed loop antennas 259$_1$ and 259$_2$ to provide mechanical stability. Omnidirectional horizontal loop antenna 240 may be oriented to lie in the x-y plane.

In the preferred embodiment, the full vector sensor antenna has a diameter between 1 meter and 5 meters. The antennas have ultrawideband radiation pattern characteristics, such that the radiation pattern shape remains essentially constant until the operating frequency approaches resonance of the antennas.

In certain embodiments, the receiving antenna elements form a collocated array of antenna elements with common phase centers. In some embodiments, the receive antenna elements operate over the frequency band 0.1 MHz to up to 70 MHz.

Figure 11:
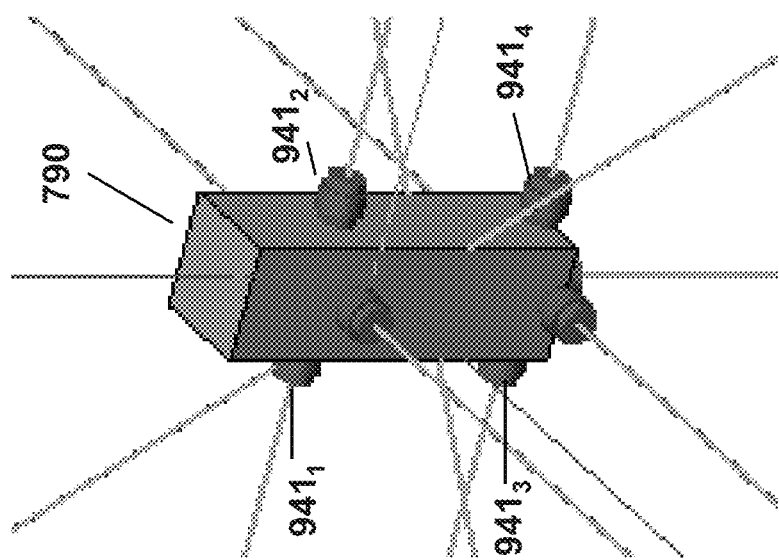
FIG. 11 is an enlarged view of the housing showing the connection ports for one of the full loop antennas.

FIG. 11 shows an enlarged view of the housing 790 showing the connection ports 941$_1$, 941$_2$, 941$_3$, 941$_4$ for one of the full loop antennas 259$_1$ and 25$_2$. As also shown in FIG. 5, the full loop antenna is created even though the housing 790 is disposed in the middle or the loop. This configuration is advantageous, in that it allows access to more points along the loop.

An electromagnetic simulation model was developed for a full vector sensor array shown in FIG. 10 with six modes and analyzed using the commercial FEKO software with a method of moments solver. In the electromagnetic simulations, the diameter of the vector sensor array was assumed to be approximately 3 meters, and the array was housed on a 3U cubesat body. The monopole antenna 132 was assumed to be 1.5 meters long. The antennas were modeled as thin wires. Each vector sensor antenna was driven with the desired amplitude and phase while the surrounding antennas were terminated in 50-ohm loads.

Figure 12:
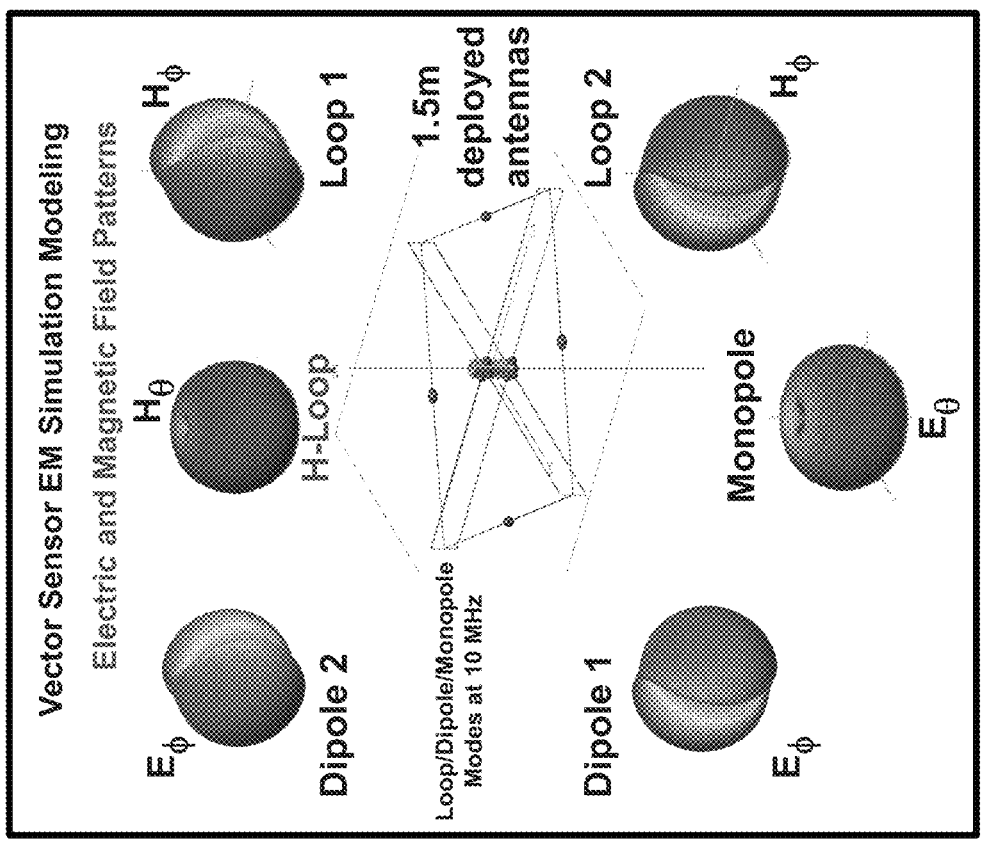
FIG. 12 shows electromagnetic simulations of the electric and magnetic field radiation patterns for the six vector sensor modes which include two crossed dipoles, two crossed loops, a vertical monopole, and a horizontal loop.

FIG. 12 summarizes the polarized ($E_\theta$, $E_\phi$, $H_\theta$, $H_\phi$) radiation patterns of the six vector sensor modes. In FIG. 12, standard spherical coordinates are used and the radiation patterns shown are at 10 MHz. Dipole 1 is oriented along the x axis and responds to the $E_\phi$ field with a peak along the y axis. Dipole 2 is oriented along the y axis and responds to the $E_\phi$ field with a peak along the x axis. Loop 1 is in the xz plane and has peak radiation along the x axis. Loop 2 is in the yz plane and has peak radiation along the y axis. The monopole mode responds to the $E_\theta$ component and is omnidirectional with respect to the z axis. The horizontal loop mode responds to the $H_\theta$ component and is omnidirectional with respect to the z axis. The radiation pattern shapes are frequency independent up to the range of approximately 40 to 70 MHz where the antennas approach resonance.

Figure 13:
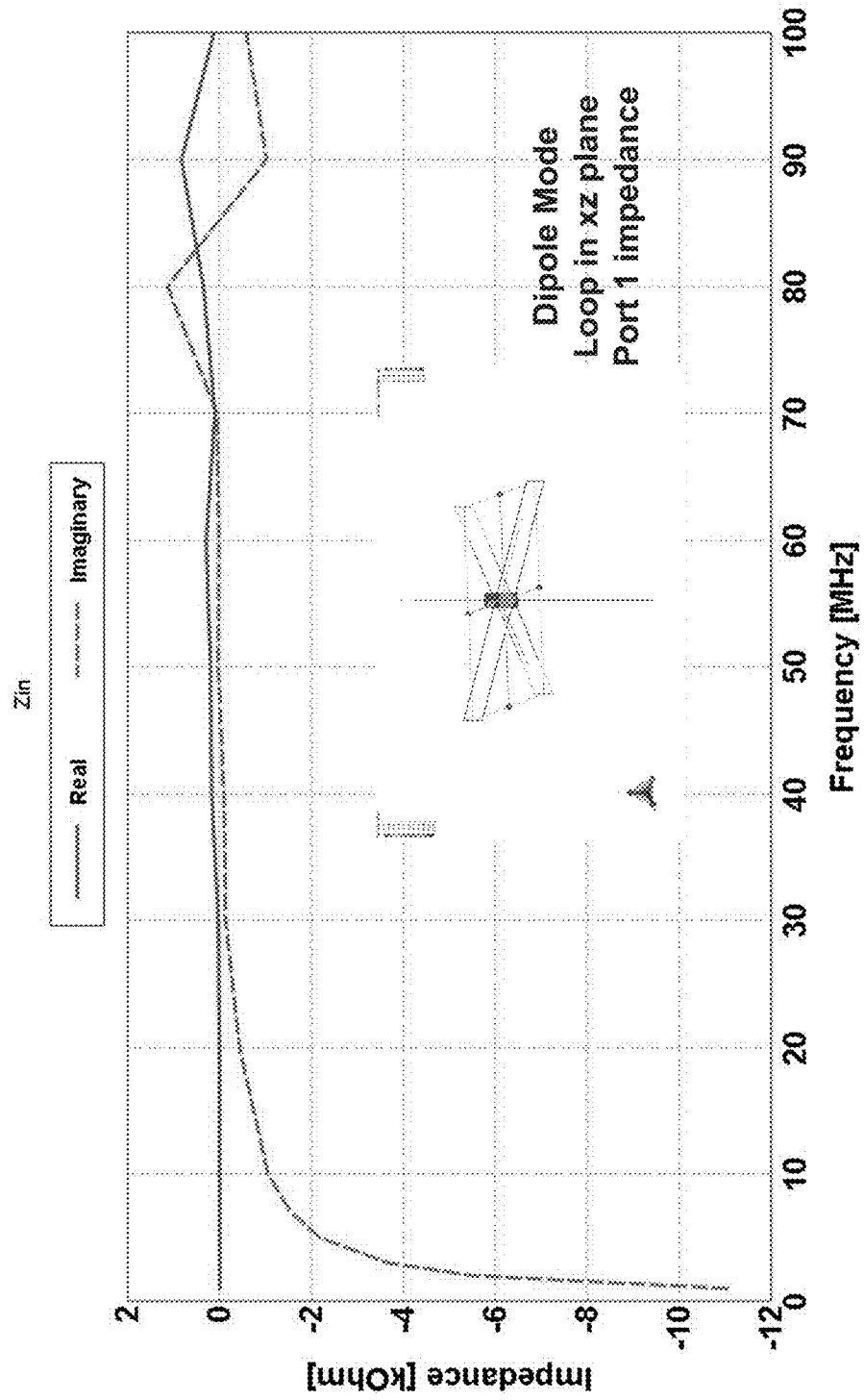
FIG. 13 is the simulated input impedance for the vector sensor dipole mode.
Figure 14:
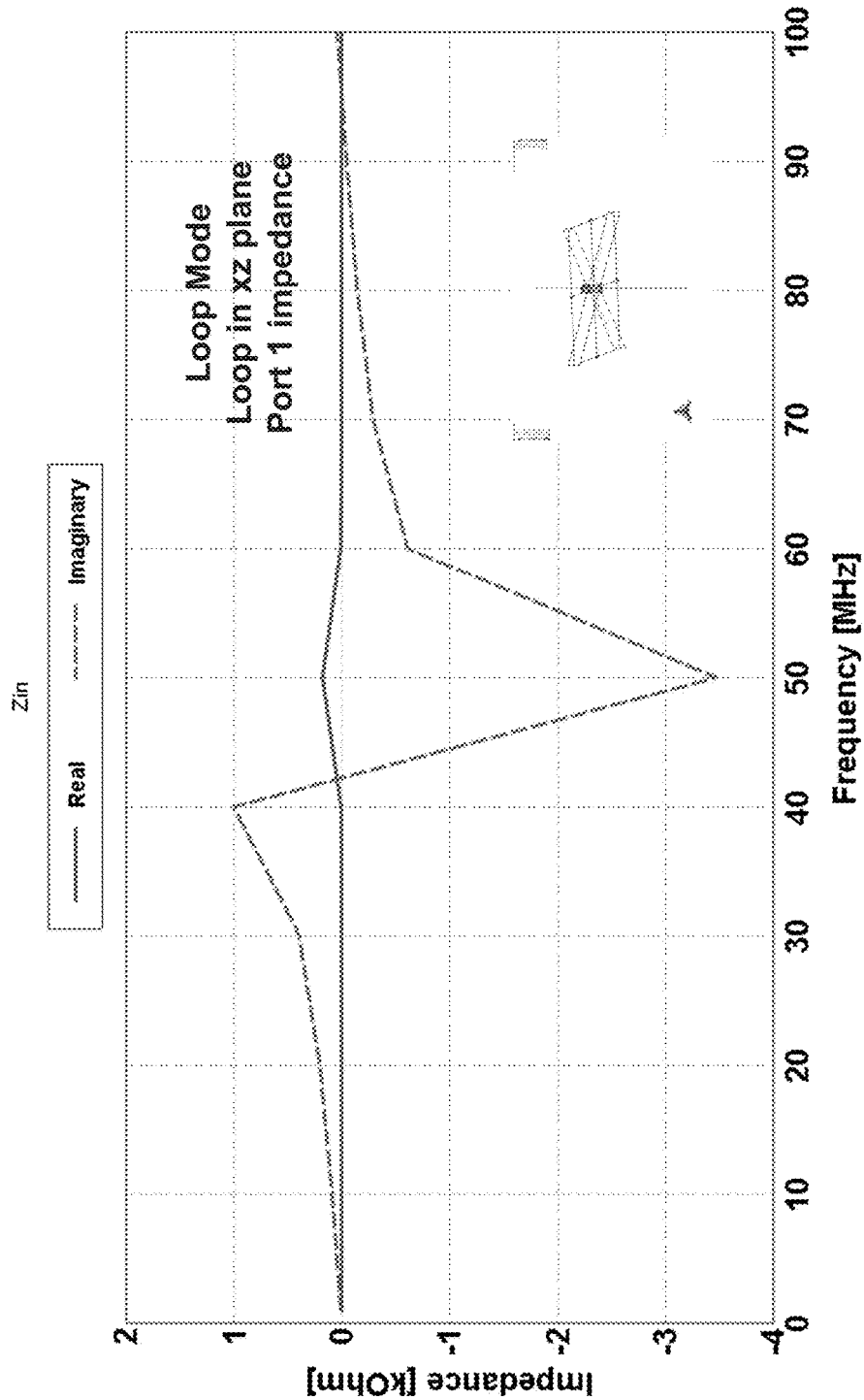
FIG. 14 is the simulated input impedance for the vector sensor vertical loop mode.
Figure 15:
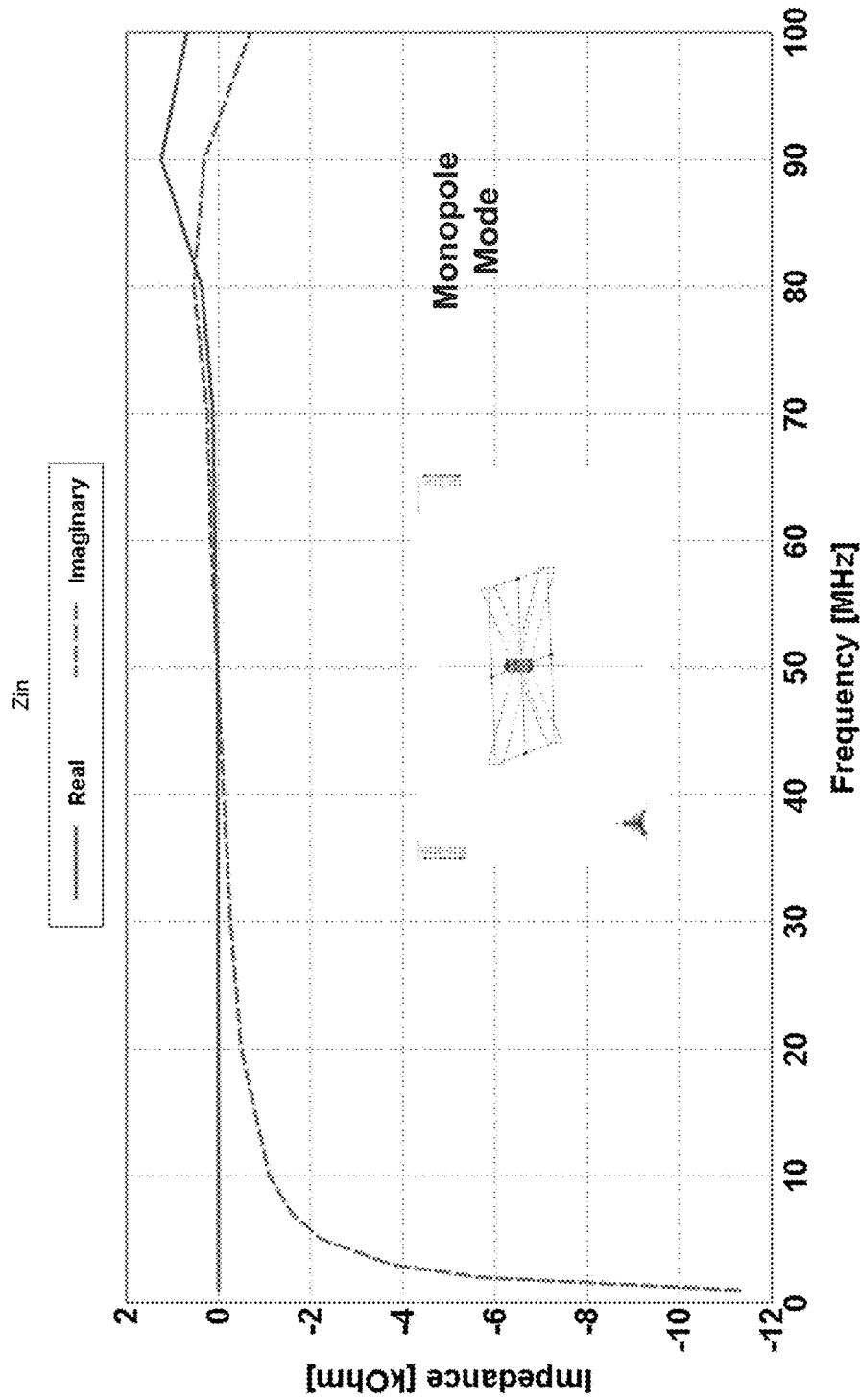
FIG. 15 is the simulated input impedance for the vector sensor vertical monopole mode.
Figure 16:
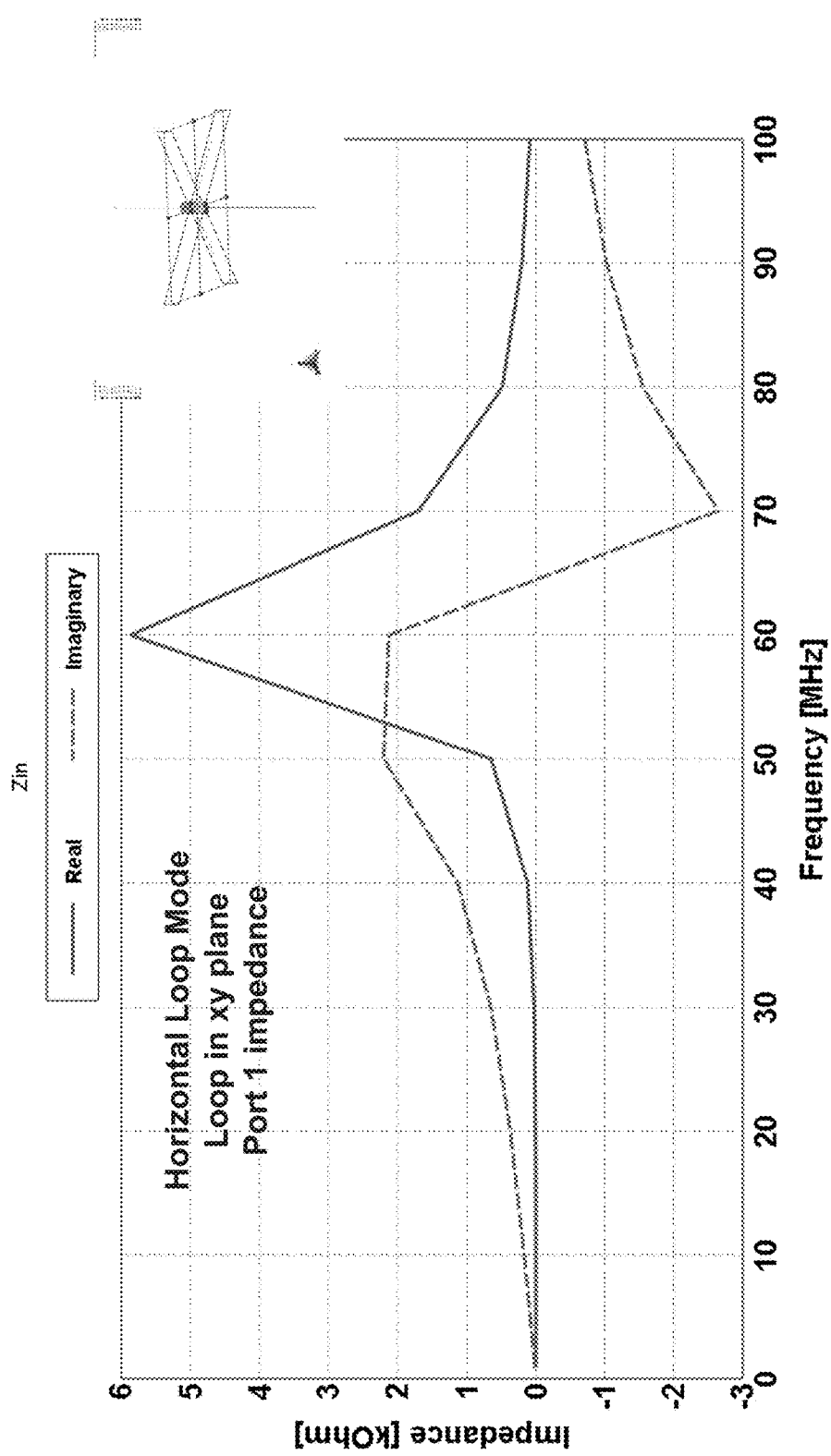
FIG. 16 is the simulated input impedance for the vector sensor horizontal loop mode.
Figure 17:
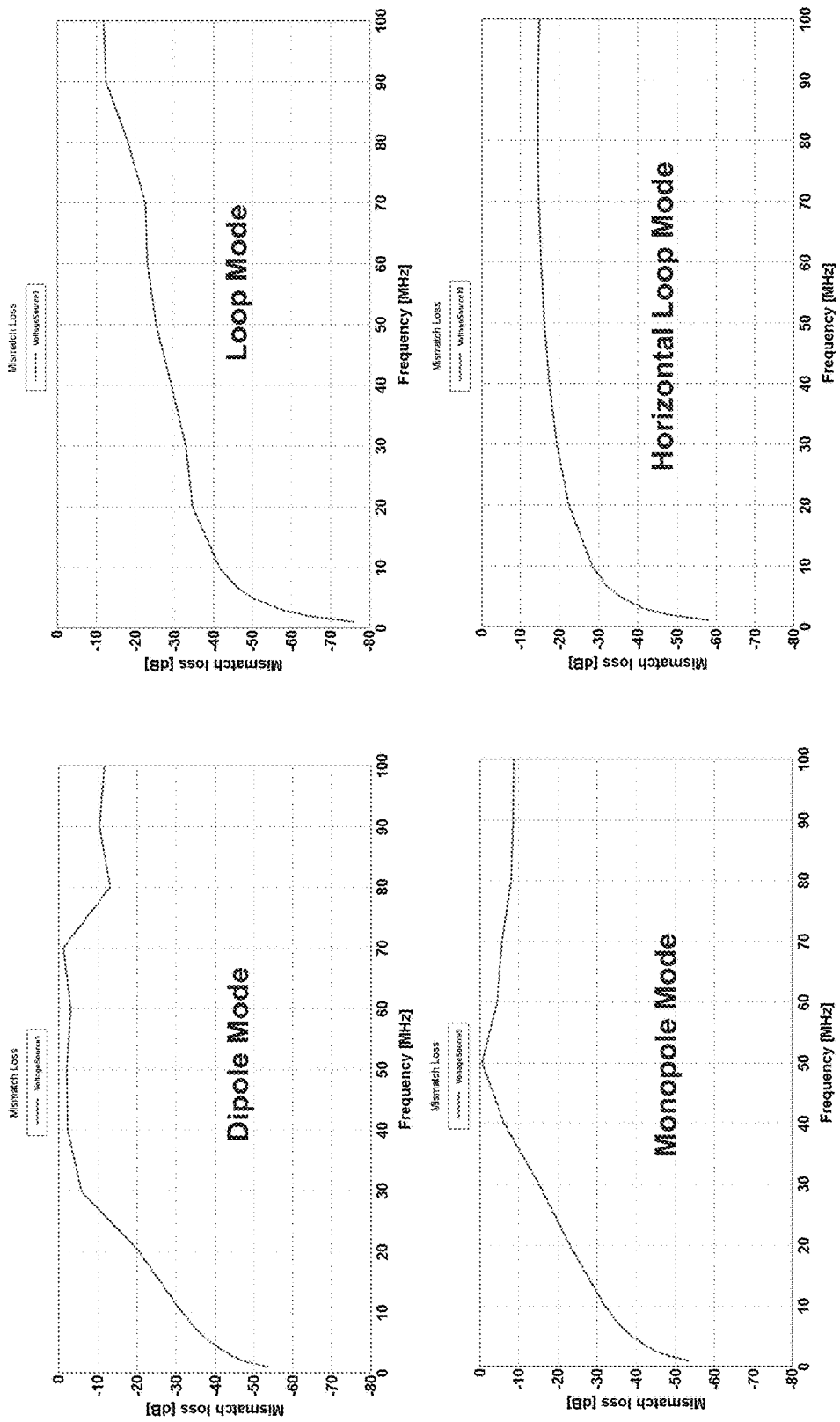
FIG. 17 shows the simulated mismatch loss relative to a 50-ohm system for the vector sensor modes. The upper left graph shows x and y dipole modes. The upper right graph shows x and y loop modes. The lower left graph shows monopole mode. The lower right graph shows horizontal loop mode.
Figure 18:
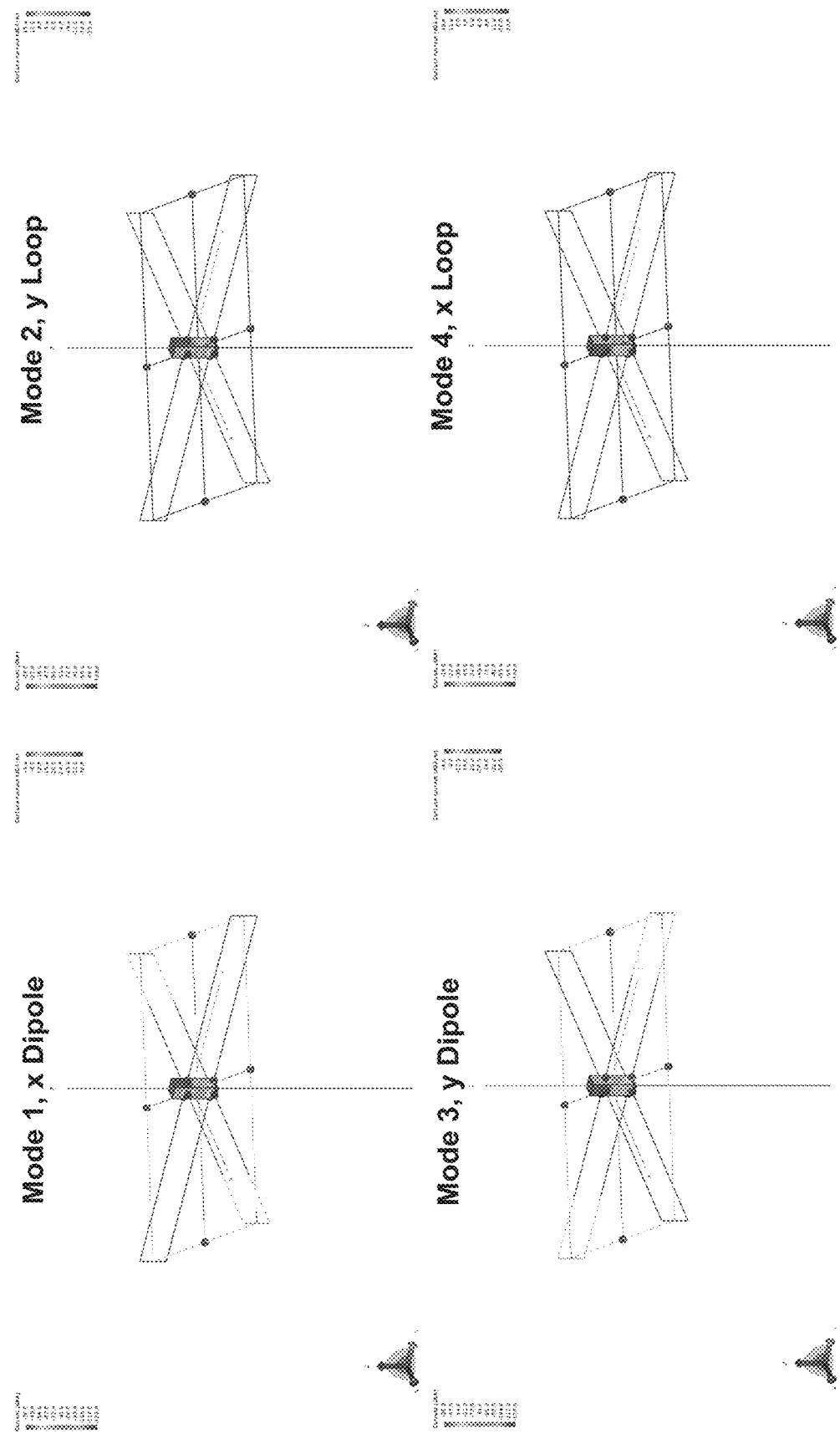
FIG. 18 shows simulated current distributions for the dipole and loop modes.

The input impedance of each of the vector sensor modes was simulated. The simulated input impedance for the vector sensor dipole mode is shown in FIG. 13 and resonance occurs near 70 MHz. FIG. 14 shows the simulated input impedance for the vector sensor vertical loop mode and resonance occurs near 42 MHz. FIG. 15 shows the simulated input impedance for the vector sensor vertical monopole mode and resonance occurs near 50 MHz. FIG. 16 shows the simulated input impedance for the vector sensor horizontal loop mode and resonance occurs near 63 MHz. The input impedances for these modes are summarized in Tables 1 to 4. FIG. 17 shows the simulated mismatch loss relative to a 50-ohm system for the vector sensor modes. FIG. 18 shows simulated current amplitude distributions for the dipole and loop modes, and FIG. 19 shows simulated current distributions for the monopole and horizontal loop modes.

Referring back to FIG. 10, the feedlines 411$_1$, 411$_2$, 411$_3$, 411$_4$ for the horizontal loop 240 can be twin lead, twisted pair, or coaxial cable depending on the beamformer design. The cubesat housing 790 contains the beamforming circuit that provides the necessary amplitude and phasing to form the desired vector sensor modes. Two types of vector sensor beamforming circuits are shown in FIG. 20 and FIG. 21.

FIG. 20 shows a PC board 904 according to one embodiment. The inputs and outputs to the PC board 904 are shown along the outer edge. Ports 941$_1$-941$_3$ represent the eight connection points for the loop antennas 259$_1$, 259$_2$ (see FIGS. 10 and 11). Each pair of ports, such as ports 941$_1$ and 941$_2$ attach to legs of different half loops in a loop antenna (see FIG. 11). Each pair of ports is in communication with a respective balun 92$_1$-92$_4$, which converts the unbalanced signals from the antenna to balanced signal. Since each loop antenna has four ports, there are a total of eight ports and four baluns 92$_1$-92$_4$. The signals from the two baluns associated with each loop antenna are fed to a hybrid magic tee device 501$_1$, 501$_2$. Thus, the ports 941$_1$-941$_4$ utilize hybrid magic tee device 501$_1$ and the ports 941$_5$-941$_8$ utilize hybrid magic tee device 501$_2$.

Figure 24:
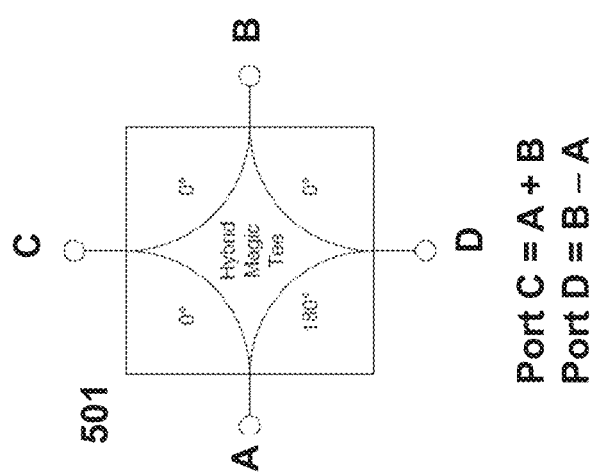
FIG. 24 is a schematic diagram of a hybrid magic tee device showing the electrical phasing of the RF ports.

Each hybrid magic tee device 501$_1$, 501$_2$ has two outputs, a sum and a difference. A schematic diagram of a hybrid magic tee device 501 is shown in FIG. 24. The hybrid magic tee ports are designated A, B, C, and D and the phasing between the ports is indicated. The C port provides the sum of the received signals at ports A and B, that is, C=A+B. The D port provides the difference between the received signals at ports A and B, that is, D=B−A. Importantly, the sum port is used for the loop mode and the difference port is used for the dipole mode, as explained in more detail below. The 4-way divider 184 is used for the horizontal loop antenna 240 (see FIG. 10). The four signals from the 4-way divider 184 attach to ports C1-C4.

In FIG. 20, the ports labeled C1, C2, C3, C4 are connected to micros trip lines which are suitable for connecting coaxial cables that are routed to the loop feed points 401$_1$, 401$_2$, 401$_3$, 401$_4$. In this case with coaxial feedlines, transformer baluns with the required polarity would be located at each feed point 401$_1$, 401$_2$, 40$_3$, 401$_4$ (see FIG. 10).

FIG. 21 is similar to FIG. 20 in many ways. For example, the circuitry associated with the loop antennas $259_1$, $259_2$ is identical. Differences exist in the control of the horizontal loop antenna 240. In FIG. 21, there are four baluns $92_5$, $92_6$, $92_7$, $92_8$, that are used to feed the horizontal loop antenna 240, and the polarity ± of the connections W1, W2, W3, W4, W5, W6, W7, W8 to the antennas are indicated corresponding to the desired polarities shown in FIG. 10. With the four baluns $92_5$, $92_6$, $92_7$, $92_8$, twisted pair or twin lead wires can connect to the four feed points $401_1$, $401_2$, $401_3$, $401_4$. (see FIG. 10)

Figure 31:
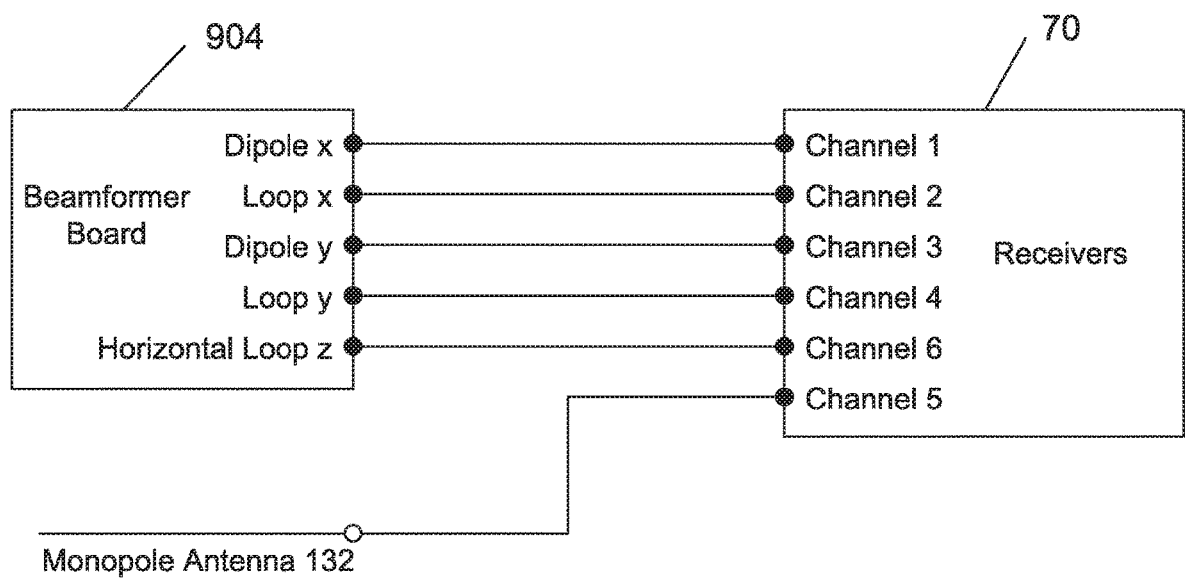
FIG. 31 shows the connections between the beamformer and the receiver.

The outputs from the beamformer disposed on PC board 904 are connected to the receiver 70, as shown in FIG. 31. Specifically, the five outputs from the beamformer (Dipole x, Loop x, Dipole y, Loop y and horizontal loop z) are each in communication with a respective channel on the receiver 70. Additionally, the monopole antenna 132 is also in communication with a channel of the receiver 70. Thus, the receiver 70 receives six different modes. The terms "mode" and "channel" are used interchangeably in this disclosure. The receiver 70 can filter, down convert, and digitize the received radio frequency waves. A signal processing unit BO processes the digitized data, and then on-board global positioning system (GPS) and inertial navigation system (INS) data are used as reference position and orientation information in mapping the location of the galactic radio frequency source.

Figure 22:
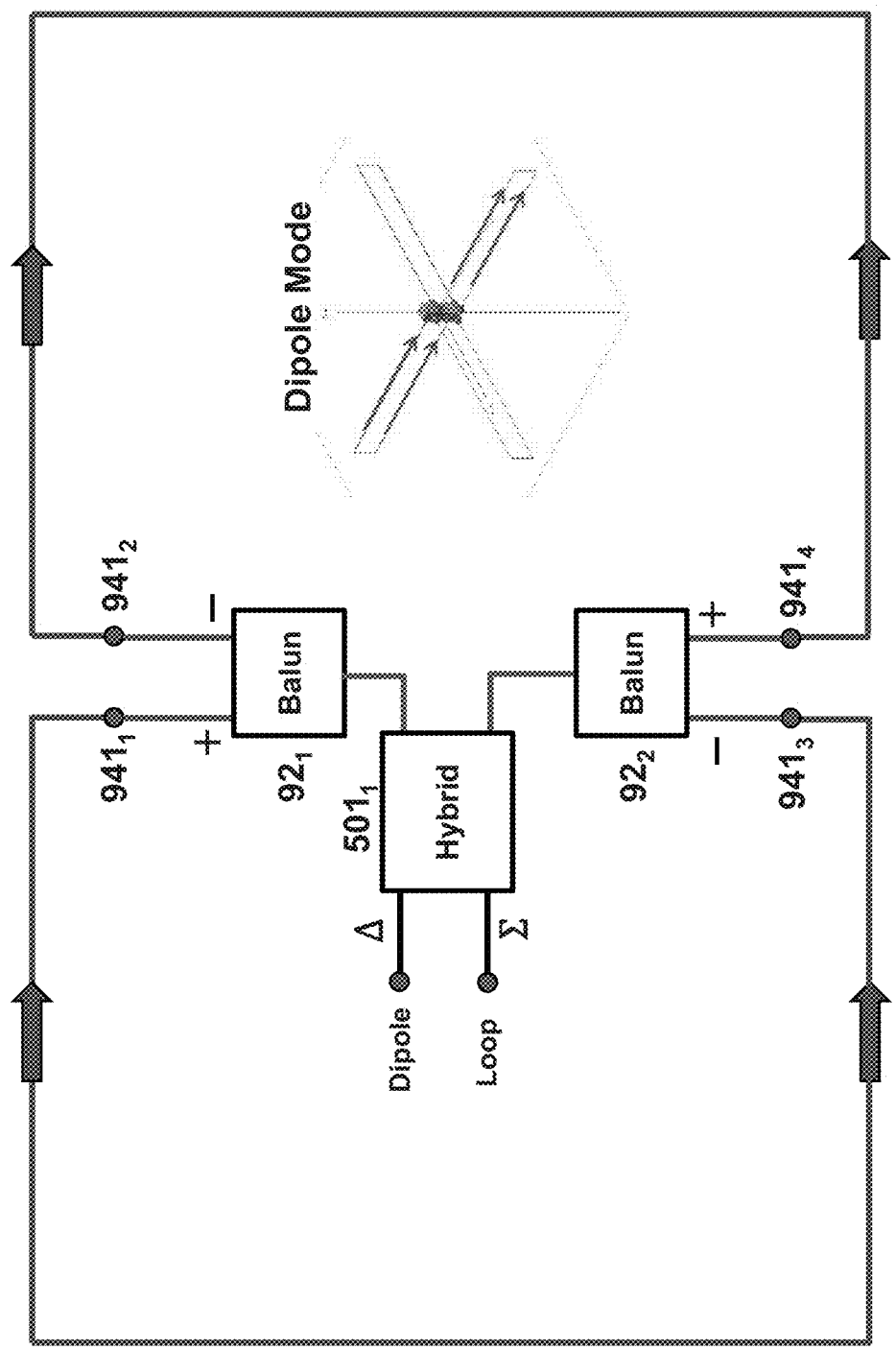
FIG. 22 is a schematic diagram of a vector sensor antenna beamformer in which the sum port of a hybrid magic tee component generates dipole mode current flow.
Figure 23:
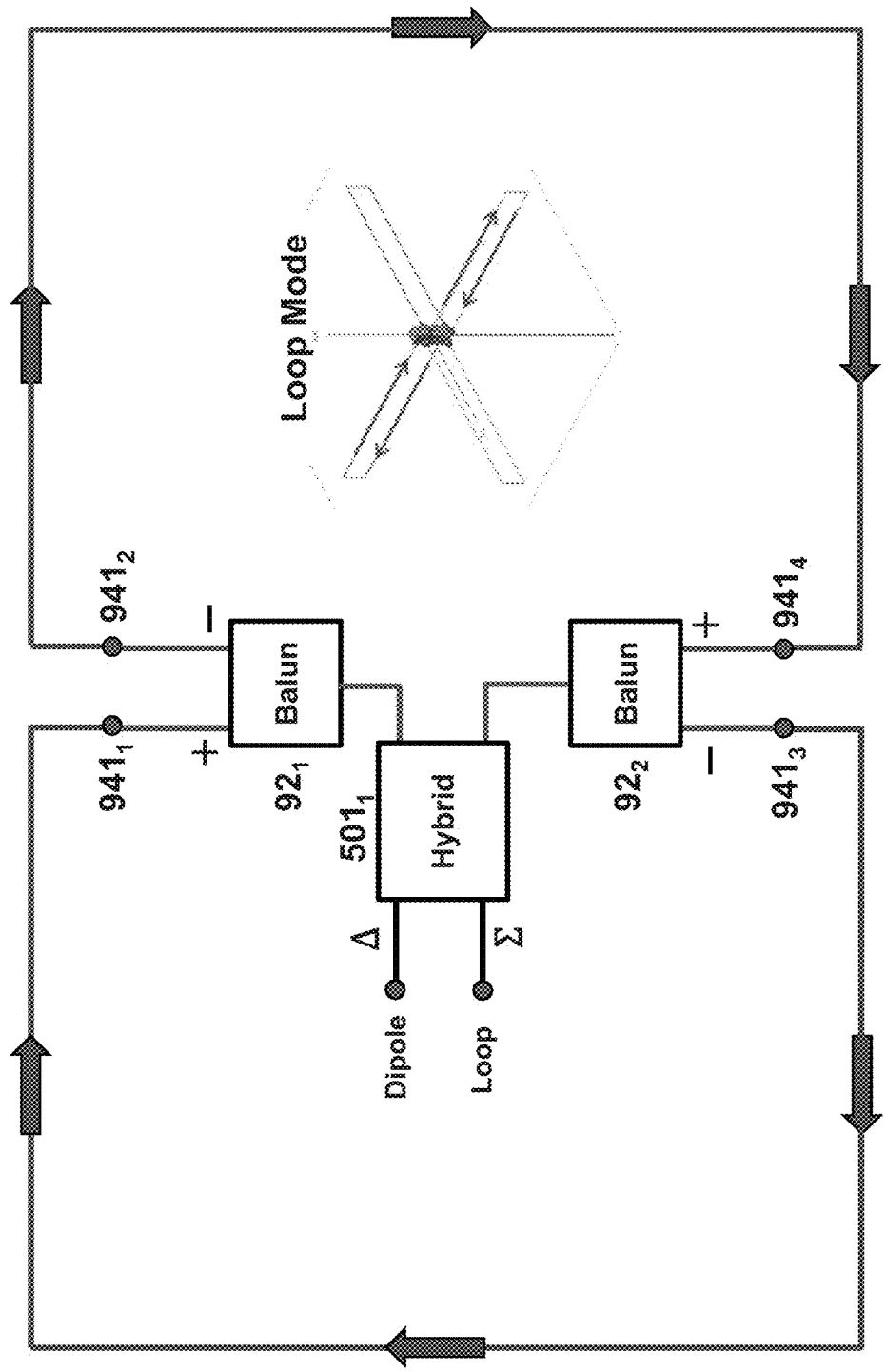
FIG. 23 is a schematic diagram of a vector sensor antenna beamformer in which the difference port of a hybrid magic tee component generates loop mode current flow.

FIG. 22 shows a simplified schematic diagram of the vector sensor antenna beamformer in which the difference port of a hybrid magic tee device $501_1$ generates dipole mode current flow. FIG. 23 shows a schematic diagram of a vector sensor antenna beamformer in which the sum port of a hybrid magic tee device $501_1$ generates loop mode current flow.

Figure 25:
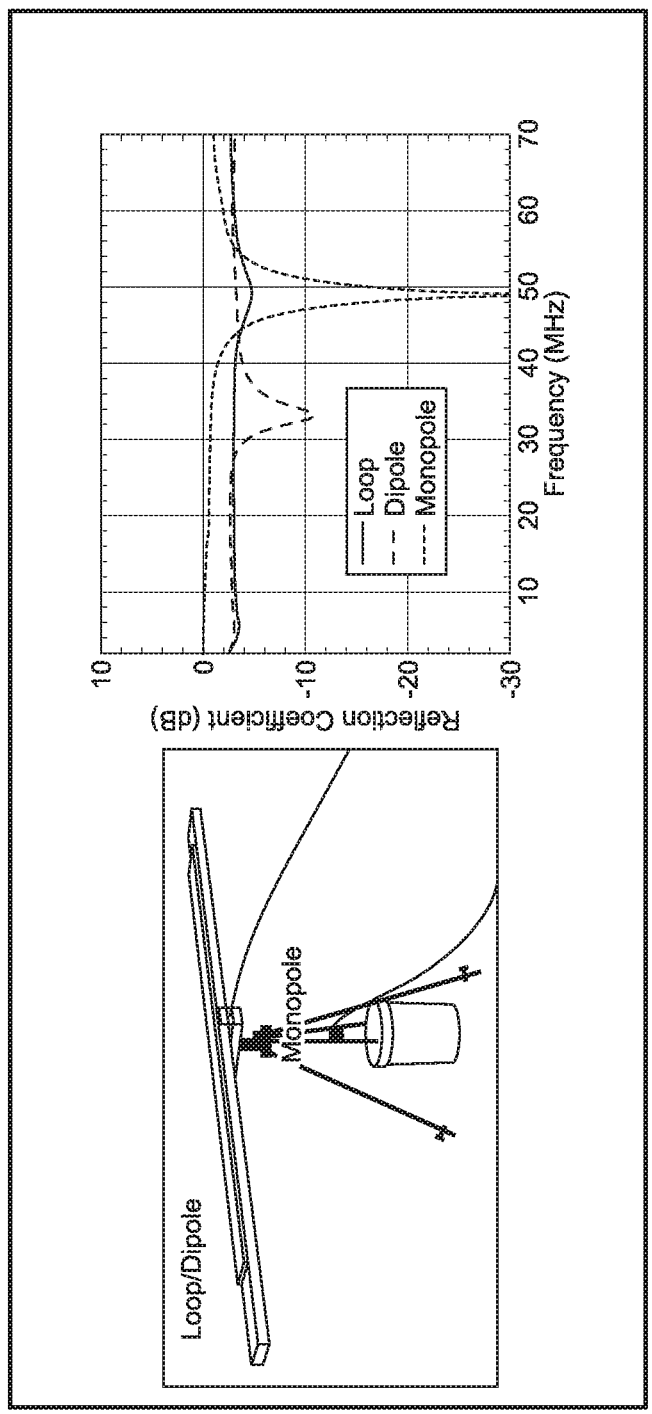
FIG. 25 shows a prototype vector sensor antenna and the measured reflection coefficients for loop, dipole and monopole modes.

A prototype vector sensor antenna with 1.5 meter arms with dipole, loop, and monopole modes was fabricated, and the measured reflection coefficients for these three modes is shown in FIG. 25.

Signal processing for direction finding can be performed as follows. Each of the signals received by the vector sensor modes a e connected to a channel of the microwave receiver 70 (see FIG. 31). The receiver channels amplify, filter, downconvert, and digitize the received RF signals from a galactic source. The receiver can form single or multiple channels by means of switching and filtering. A radiofrequency signal covariance matrix R is computed by taking the frequency average or time average of the digitized received voltages correlated between all pairs of vector sensor antenna modes. For the disclosed multipolarized vector sensor array antenna system, the matrix R is a six row by six column matrix. Mathematically, in computing the correlation $R_{mn}$ between the mth and nth vector sensor antenna channel voltages $V_m$ and $V_n$ respectively, the frequency average is expressed as the integral over the receive bandwidth of the product of $V_m$ and $V_n^*$ where * means complex conjugate. Well known direction finding algorithms can then be used in the signal processing computer to generate the coordinates of galactic RF source.

Figure 26B:
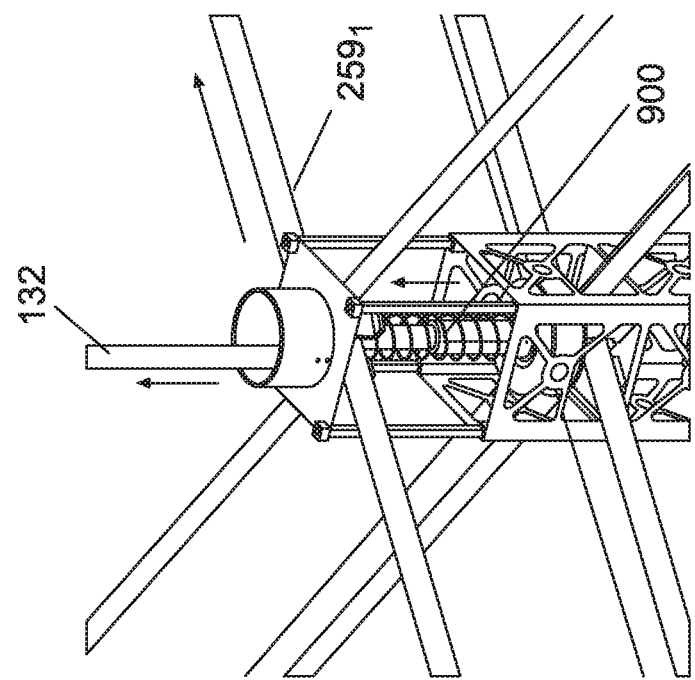
FIGS. 26A-B shows a conceptual deployment mechanism for the vector sensor antennas on a cubesat body.
Figure 26A:
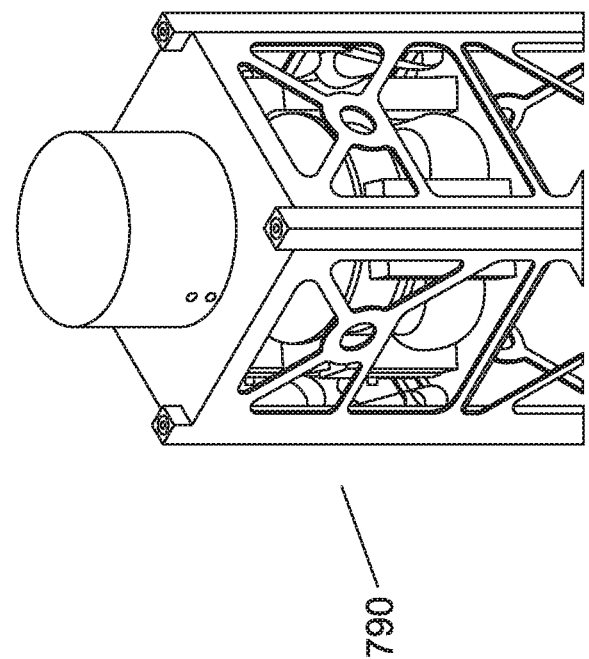

Mechanical deployment of the vector sensor antennas may be performed in a variety of ways. FIGS. 26A-26B show one possible embodiment. FIGS. 26A-B show a conceptual diagram for the deployment of the vector sensor antennas on a cubesat housing 790, where FIG. 26A shows the stowed position and FIG. 26B shows the deployed position. As shown in FIG. 26A, the loop arms 259 and horizontal loop wires are initially coiled on a telescopic hub mechanism 900 stowed within the cubesat housing 790. The monopole antenna 132 is rolled up and/or folded up and stowed in a cylindrical volume at the end of the cubesat housing 790. For example, the monopole antenna 152 may be folded back on itself a plurality of times to minimize its height. Alternatively, it may be rolled on a vertically oriented spooler.

During deployment, first, the telescopic hub mechanism 900 is extended. Then the monopole antenna 132 is extended from the external cylindrical volume. Finally, the loop arms 259 and horizontal loop are uncoiled from the telescopic hub mechanism 900, forming monopole and loop shapes as depicted during deployment in FIG. 26B.

Figure 29B:
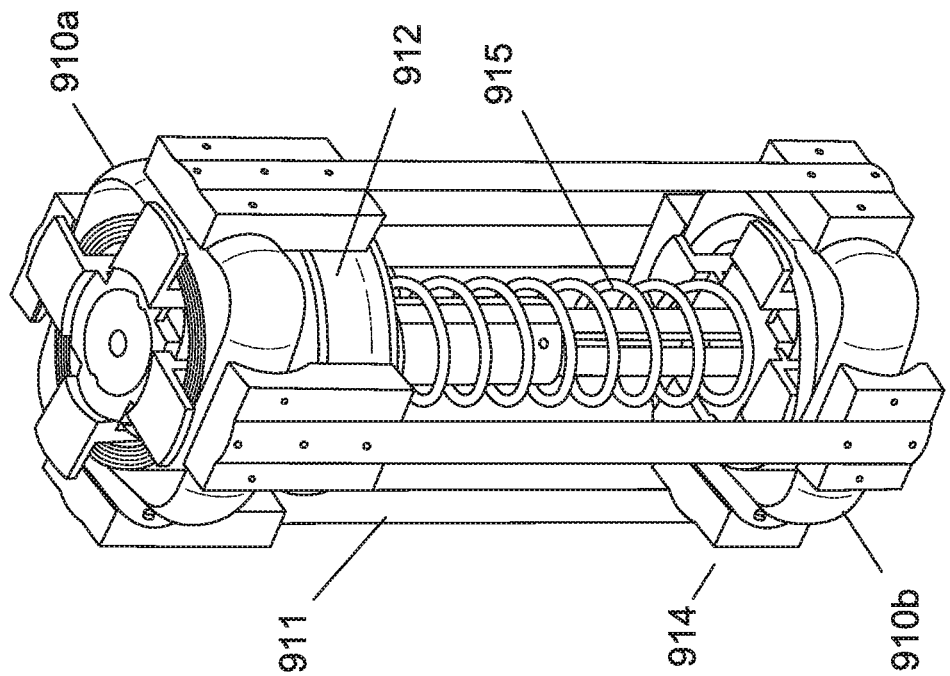
Figure 29A:
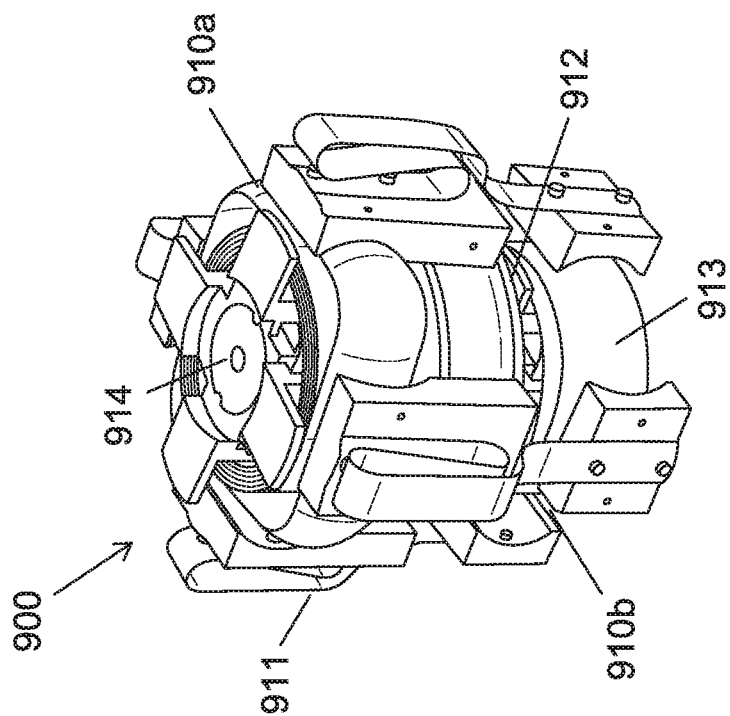

Another view of this embodiment is shown in FIGS. 29A-29D. In FIG. 29A, a perspective view of the telescopic hub mechanism 900 in the stowed position is shown. The telescopic hub mechanism 900 includes an upper spooler 910a, and a lower spooler 910b mounted on a central rod 914. These upper and lower spoolers 910a, 910b are each wound with four electrically conducting tapes 913, each tape 913 offset from the adjacent tapes by 90°. The ends of each of the four tapes 913 on upper spooler 910a is connected to the end of a respective tape 913 on lower spooler 910b by a conductive member 911. These conductive members 911 form the vertical connections for each half (see FIG. 10). These conductive members 911 may be electrically conductive wires, or electrically conductive rods. A feed spooler 912 is disposed between the upper and lower spoolers 910a, 910b. The feed spooler 912 holds the feed wire 411 used to connect to the horizontal loop antenna 240 at points 401 (see FIG. 10).

During deployment, the telescopic hub mechanism 900 first extends vertically, as shown in FIG. 29B. Springs 915 or other biasing members may be used to push the upper and lower spoolers 910a, 910b away from one another. FIG. 29B also shows a teed spooler 912. Although not shown, the horizontal loop antenna 240 may be physically connected to the conductive members 911. While the horizontal loop antenna 240 is physically attached to these conductive members 911, they are electrically isolated from one another.

After the telescopic hub mechanism. 900 has extended vertically, the upper and lower spoolers 910a, 910b start rotating to release the tapes 913 which form the loop antennas 259, as shown in FIG. 29C. The electrically conducting tapes 913 spiral outward. In certain embodiments, the upper and lower spoolers 910a, 910b and the feed spooler 912 are locked together rotationally such that all unwind at the same rate.

When the tapes 913 are fully unwound, the tapes 913 are each directed at a different perpendicular direction.

Thus, each of the four tapes 913 on upper spooler 910a forms part of a half loop. The corresponding tape 913 on lower spooler 910b shows another part of the half loop. Finally, the conductive member 911, which connects the upper tape to the lower tape, forms the final part of the half loop. Thus, when the tapes 913 are extended, four half loops, which form two crossed loop antennas 259 are formed.

Additionally, the horizontal loop antenna 240 is physically attached to the conductive members 911, and is formed when the half loops are extended outward. Specifically, the horizontal loop antenna 240 is in the shape of a square, where each corner of the horizontal loop antenna 240 is formed by one of the four conductive members 911. As noted above, feed wires 411 (see FIG. 10) are supplied to the horizontal loop antenna 240 by feed spooler 912.

As described above, the tapes 913 form the crossed loop antennas. Physical connections are made between the horizontal loop antenna 240 and the conductive member 911 at the end of each half loop. Additionally, physical connections are made at the midpoint of each side of the horizontal loop antenna 240, as the horizontal loop antenna is actually four segments, each segment in communication with feed wires 411 at each end.

Electrically conducting tape can be used as the loop antenna 259 and also as the monopole antenna 132, and electrically conducting wire can be used to form the horizontal loop antenna 240. Alternatively, non-conductive materials can be used for the structures making up the loop and monopole arms with conductive material running parallel to the nonconductive structural member. Uncoiling of the vector sensor arms can be accomplished by releasing stored strain in the coiled tapes, motors, centripetal forces, shape memory strain recovery or other actuation method.

Figure 27:
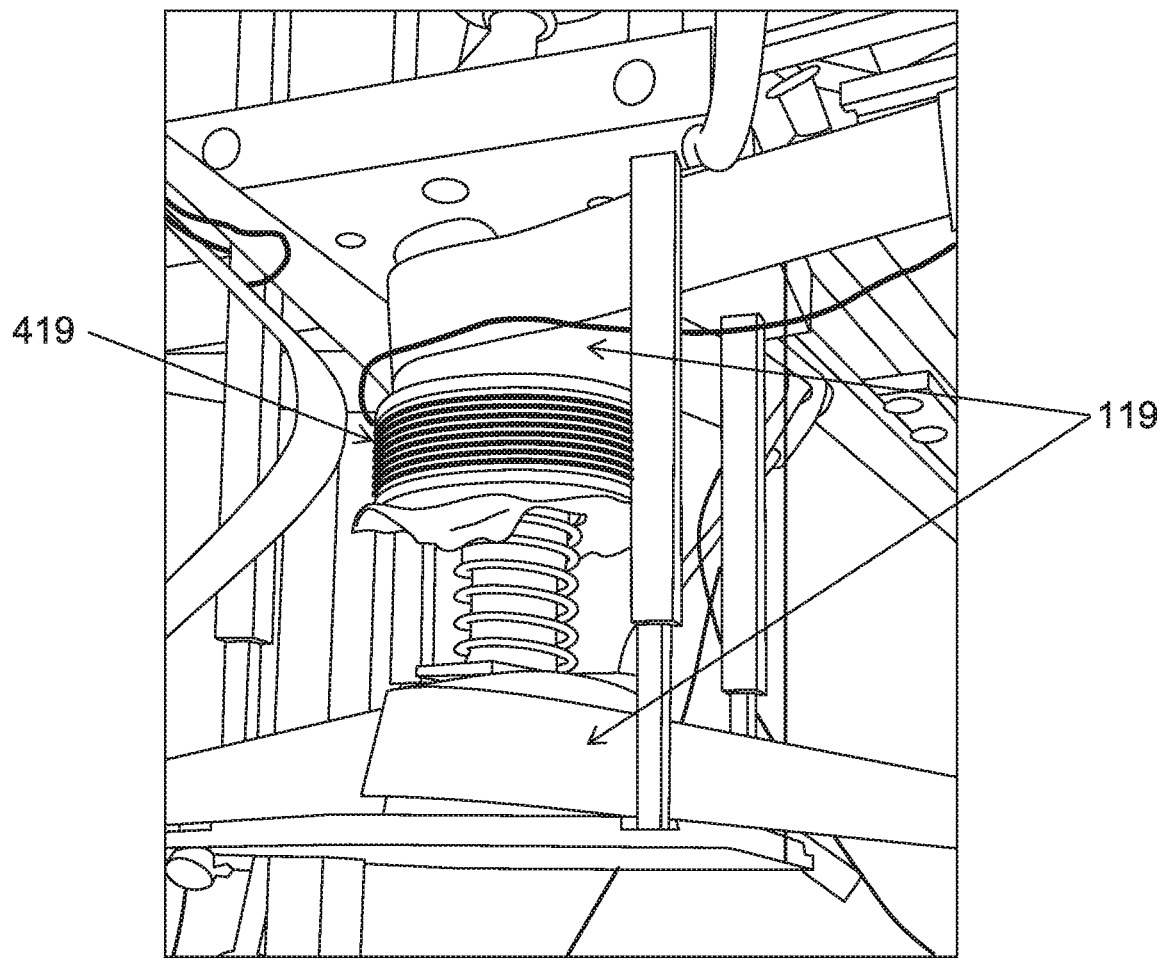
FIG. 27 shows a prototype vector sensor array with the crossed loop arms stowed.
Figure 28:
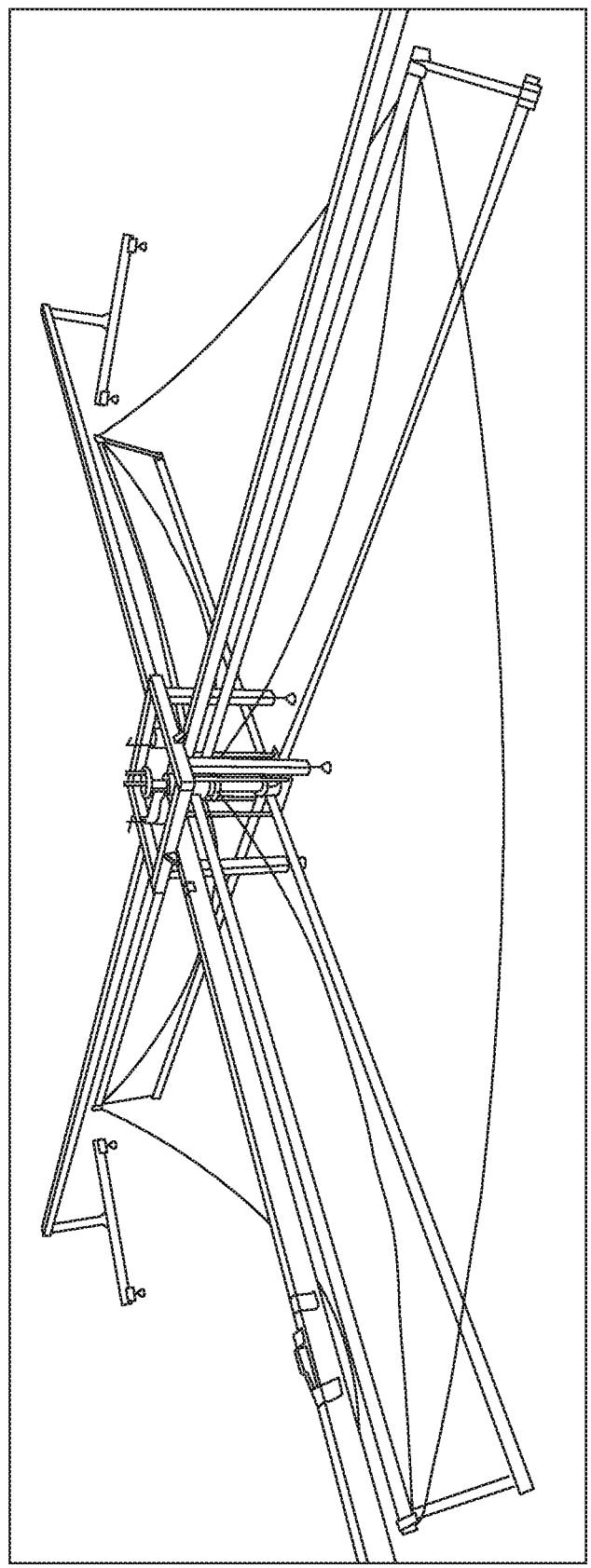
FIG. 28 shows the prototype vector sensor array with the crossed loop arms deployed.

A mechanically deployed prototype vector sensor antenna was fabricated using metal measuring tapes mounted on a hub with crossed loops supported by strings on an aluminum frame to counter gravity effects. The stowed crossed loop tapes 913 and horizontal feed wires 411 are shown in FIG. 27, and the deployed vector sensor array of crossed loops is shown in FIG. 28.

The electrical connections between the PC board 904 and the antenna segments may all be made via the central rod 914. The central rod 914 may include one or more slip rings to allow the wires that are disposed on the spoolers to pass inside the central rod 914 and connect to the PC board 904.

While FIGS. 26-29 show a plurality of spoolers 910a, 910b and 912 mounted on a central rod 914, other embodiments are also possible.

Figure 30B:
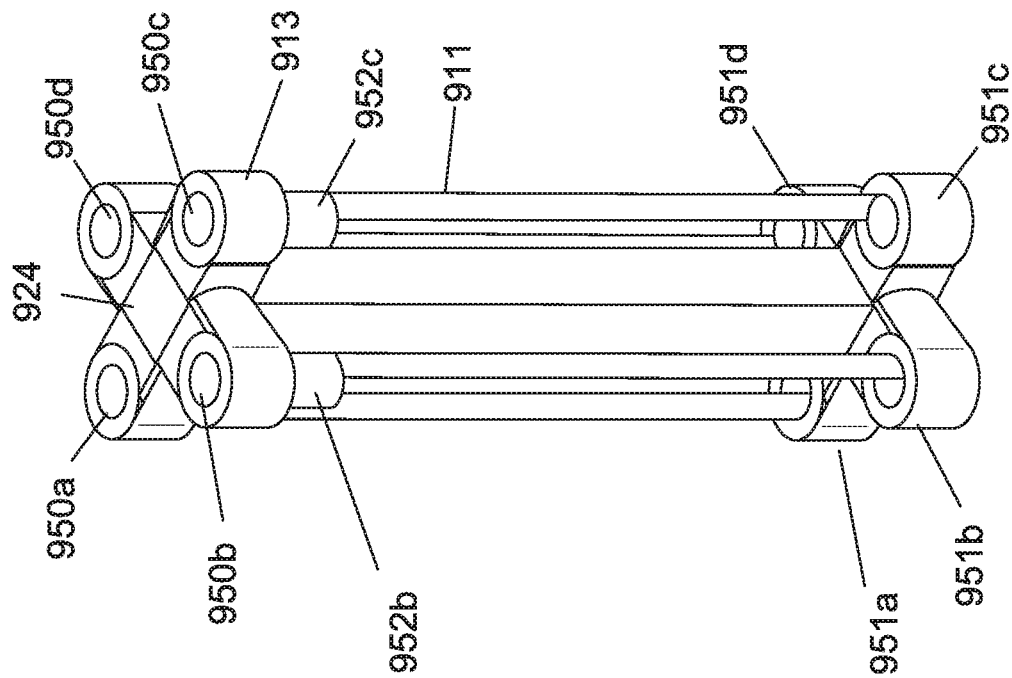
FIGS. 30A-30C show the telescoping hub mechanism and vector sensor array according to a second embodiment.
Figure 30A:
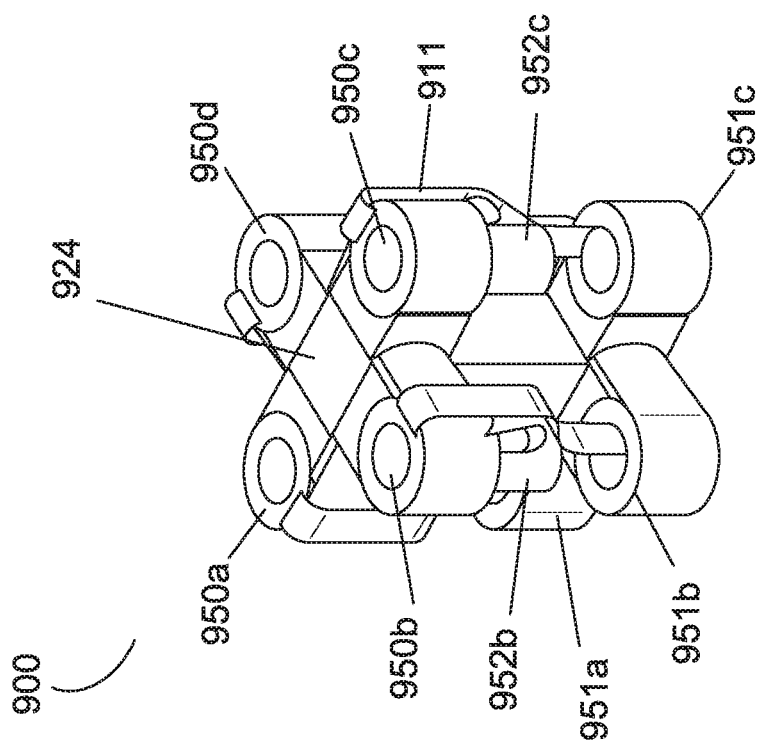
Figure 30C:
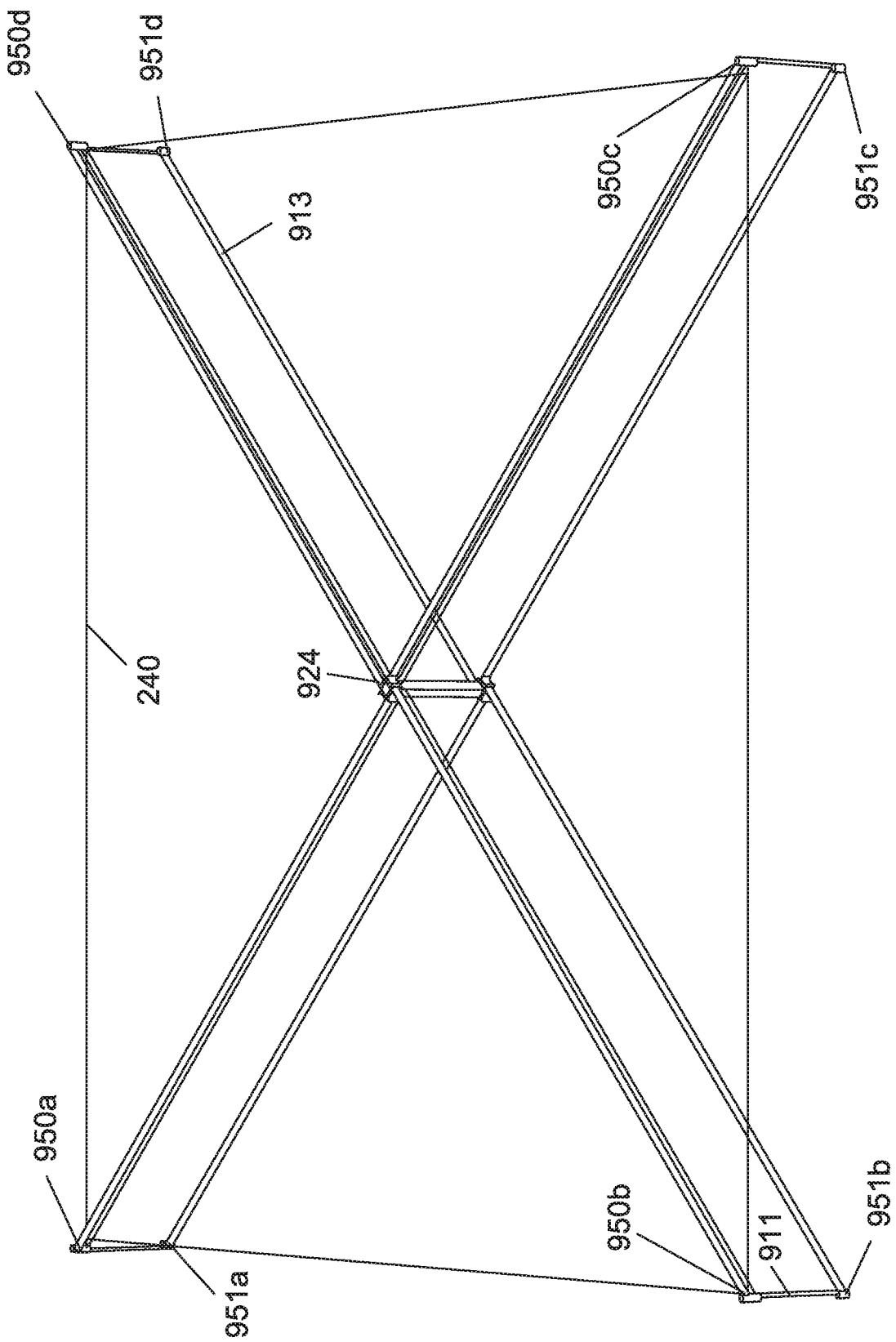

For example, FIGS. 30A-30C show a second embodiment, where the tapes 913 are affixed to the central member 924, and the spoolers are disposed around the central member 924. The central member 924 may be a cylinder, a rectangular prism or another shape. In certain embodiments, the central member 924 may include an internal cavity to route the electrical connections from the antennas to the beamformer.

Similar elements have been given identical reference designators FIG. 30A. shows a stowed position, where upper spoolers 950a-d and lower spoolers 951a-d are disposed proximate the central rod 914. Feed spoolers 952a-d are disposed between the upper and lower spoolers. While four upper spoolers, three lower spoolers and two feed spoolers are visible, it is understood that there are four of each type.

As the telescopic hub mechanism 900 is deployed, the upper spoolers 950 and the lower spoolers 951 moved away from each other, as shown in FIG. 30B. Feed spoolers 952a-d may be connected to the upper spoolers in some embodiments. Unlike the embodiment of FIGS. 29A-29C, the spoolers are not attached to the central member 924. Rather, the tapes 913 and feed wires 411 may be directly attached to the central member 924 without the need for slip rings.

FIG. 30C shows the vector sensor array in the deployed position, where the spoolers are all located at the far extremity of the half loops. In certain embodiments, rods (not shown) may be used to connect each of the four sets of the upper spooler, feed spooler and lower spooler. In another embodiment, the conductive members 911 serve this function. This may help maintain the desired spatial relationship and insure that each spooler unwinds at the same rate. The upper spoolers 950a-d and lower spoolers 951a-d are disposed at the distal ends of the loop antennas, while the feed spoolers 952a-d are disposed along the horizontal loop antenna 240 between the upper and lower spoolers.

In certain embodiments, the multipolarized vector sensor array antenna system can be mounted on structures including ships, towers, ground vehicles, or satellites. In certain embodiments, to take account of electromagnetic field scattering effects the multipolarized vector sensor array antenna system is calibrated on a structure by using a known radiofrequency transmitting source and measuring the signal of the known source at multiple angles prior to geolocating the unknown location of an RF signal source. The array antenna calibration can be accomplished by electromagnetic simulations and by measurements.

While the invention has been particularly shown and described with references to illustrated embodiments thereof, it will be understood by those skilled in the art that various changes in form and details may be made therein without departing from the spirit and scope of the invention as defined by the appended claims. For instance, the apparatus described herein is applicable from low RF frequencies to high microwave frequencies. Further, the invention is applicable to installation on towers, in buildings, and on vehicles such as ground moving vehicles, airborne vehicles, and satellites. In addition to galactic RF source mapping, with appropriate scaling of the size of the antenna array, the invention can be applied to geolocation in search and rescue in which the RF source an emergency beacon.

TABLE 1

Zin Port 1 Dipole 1, Mode 1

| "Frequency" [Hz] | "Real [Ohm]" | "Imaginary [Ohm]" |
|---|---|---|
| 1.00000000E+06 | 2.66630741E+00 | −1.10396170E+04 |
| 2.00000000E+06 | 2.70353141E+00 | −5.51150658E+03 |
| 3.00000000E+06 | 2.76572853E+00 | −3.66509722E+03 |
| 5.00000000E+06 | 2.96608767E+00 | −2.18123433E+03 |
| 7.00000000E+06 | 3.27047103E+00 | −1.53875570E+03 |
| 1.00000000E+07 | 3.93307282E+00 | −1.04796452E+03 |
| 2.00000000E+07 | 8.38820089E+00 | −4.29416594E+02 |
| 3.00000000E+07 | 3.00818124E+01 | −1.27870816E+02 |
| 4.00000000E+07 | 1.74564349E+02 | −9.06338523E+01 |
| 5.00000000E+07 | 2.00512153E+02 | 3.15909142E+01 |
| 6.00000000E+07 | 2.94557358E+02 | 1.96771095E+01 |
| 7.00000000E+07 | 1.03970218E+02 | 5.84982508E+01 |
| 8.00000000E+07 | 3.55275364E+02 | 1.13963854E+03 |
| 9.00000000E+07 | 8.30923988E+02 | −1.01677110E+03 |
| 1.00000000E+08 | 1.23420273E+02 | −5.76166738E+02 |

TABLE 2

Zin Port 1, Loop 1, Mode 2

| "Frequency" [Hz] | "Real [Ohm]" | "Imaginary [Ohm]" |
|---|---|---|
| 1.00000000E+06 | 3.45672135E−07 | 8.62295345E+00 |
| 2.00000000E+06 | 5.54260567E−06 | 1.72645497E+01 |
| 3.00000000E+06 | 2.81599001E−05 | 2.59435934E+01 |
| 5.00000000E+06 | 2.19793945E−04 | 4.34910433E+01 |
| 7.00000000E+06 | 8.59168265E−04 | 6.14254091E+01 |
| 1.00000000E+07 | 3.71532280E−03 | 8.94389789E+01 |
| 2.00000000E+07 | 7.53995782E−02 | 2.02390855E+02 |
| 3.00000000E+07 | 4.10316916E−01 | 3.95570734E+02 |
| 4.00000000E+07 | 6.16428095E+00 | 1.00677788E+03 |
| 5.00000000E+07 | 1.78447609E+02 | −3.47225315E+03 |
| 6.00000000E+07 | 9.31746215E+00 | −6.10884743E+02 |
| 7.00000000E+07 | 2.42061007E+00 | −2.89541229E+02 |
| 8.00000000E+07 | 1.83372067E+00 | −1.43615744E+02 |
| 9.00000000E+07 | 1.32405384E+00 | −4.50254572E+01 |
| 1.00000000E+08 | 1.43256185E+00 | 4.21008965E+01 |

TABLE 3

Zin Port 1 z Monopole, Mode 5

| "Frequency" [Hz] | "Real [Ohm]" | "Imaginary [Ohm]" |
|---|---|---|
| 1.00000000E+06 | 2.94648697E+00 | −1.12978460E+04 |
| 2.00000000E+06 | 2.99021657E+00 | −5.64312813E+03 |
| 3.00000000E+06 | 3.05498107E+00 | −3.75565750E+03 |
| 5.00000000E+06 | 3.22321304E+00 | −2.24107474E+03 |
| 7.00000000E+06 | 3.42719298E+00 | −1.58756166E+03 |
| 1.00000000E+07 | 3.80522794E+00 | −1.09155338E+03 |
| 2.00000000E+07 | 5.97492433E+00 | −4.85908748E+02 |
| 3.00000000E+07 | 1.02648874E+01 | −2.52164500E+02 |
| 4.00000000E+07 | 1.84381192E+01 | −1.03604910E+02 |
| 5.00000000E+07 | 3.55597892E+01 | 2.44554564E+01 |
| 6.00000000E+07 | 9.09631703E+01 | 1.72021880E+02 |
| 7.00000000E+07 | 1.23438567E+02 | 2.48650428E+02 |
| 8.00000000E+07 | 3.71756857E+02 | 5.43107845E+02 |
| 9.00000000E+07 | 1.24579123E+03 | 3.14692392E+02 |
| 1.00000000E+08 | 6.88832127E+02 | −6.83754964E+02 |

TABLE 4

Zin Port 1 z Loop, Mode 6

| "Frequency" [Hz] | "Real [Ohm]" | "Imaginary [Ohm]" |
|---|---|---|
| 1.00000000E+06 | 2.20709674E−05 | 1.64703883E+01 |
| 2.00000000E+06 | 3.53449673E−04 | 3.29684170E+01 |
| 3.00000000E+06 | 1.79199939E−03 | 4.95218494E+01 |
| 5.00000000E+06 | 1.38934445E−02 | 8.29073442E+01 |
| 7.00000000E+06 | 5.37616987E−02 | 1.16856257E+02 |
| 1.00000000E+07 | 2.27467014E−01 | 1.69364520E+02 |
| 2.00000000E+07 | 4.03025270E+00 | 3.69794142E+02 |
| 3.00000000E+07 | 2.51660844E+01 | 6.50771193E+02 |
| 4.00000000E+07 | 1.18768936E+02 | 1.12996018E+03 |
| 5.00000000E+07 | 6.49151377E+02 | 2.20023326E+03 |
| 6.00000000E+07 | 5.86959405E+03 | 2.12452208E+03 |
| 7.00000000E+07 | 1.69278317E+03 | −2.64566886E+03 |
| 8.00000000E+07 | 4.86708411E+02 | −1.55412435E+03 |
| 9.00000000E+07 | 2.00796403E+02 | −1.02890932E+03 |
| 1.00000000E+08 | 8.61224247E+01 | −7.15410321E+02 |

What is claimed is:

1. A receiving array antenna system comprising:
an electrically conductive housing;
a receiving antenna array disposed on the housing; and
a telescopic hub mechanism, the hub mechanism comprising an upper spooler and a lower spooler, disposed about a common axis, each spooler wound with four electrically conducting wires, wherein the ends of each electrically conducting wire on the upper spooler is electrically connected to the end of a respective electrically conducting wire on the lower spool with a conducting member to form four half loops;
wherein the receiving antenna array is stowed within the housing during a first time period and deployed outside of the housing during a second time period.

2. The receiving array antenna system of claim 1, wherein the antennas are constructed from a metallic electrical conducting wire, a tubular material or a strip material.

3. The receiving array antenna system of claim 1, further comprising a biasing member, which when the hub mechanism is deployed, pushes the upper spooler away from the lower spooler.

4. The receiving array antenna system of claim 1, wherein an additional electrically conductive wire is physically attached to each conducting member, such that when deployed, the additional electrically conductive wire forms a horizontal loop antenna in the shape of a square, where each conducting member forms a corner of the square.

5. The receiving array antenna system of claim 4, further comprising a feeder spooler wound with four feed wires, each feed wire in electrical communication with one side of the horizontal loop antenna.

6. A receiving array antenna system, comprising:
an electrically conductive housing;
a receiving antenna array disposed on the housing; and
a telescopic hub mechanism, the hub mechanism comprising four upper spoolers and four lower spoolers, arranged such that each upper spooler and a respective lower spool are disposed about a common axis, each spooler wound with an electrically conducting wire, wherein the ends of each electrically conducting wire on an upper spooler electrically connected to the end of a respective electrically conducting wire on a respective lower spool with a conducting member to form four half loops;
wherein the receiving antenna array is stowed within the housing during a first time period and deployed outside of the housing during a second time period.

7. The receiving array antenna system of claim 6, wherein, when deployed, the spoolers are disposed at distal ends of the half loops.

8. The receiving array antenna system of claim 7, wherein proximate ends of the electrically conducting wires are attached to a central hub.

9. The receiving array antenna system of claim 6, wherein an additional electrically conductive wire is physically attached to each conducting member, such that when deployed, the additional electrically conductive wire forms a horizontal loop antenna in the shape of a square, where each conducting member forms a corner of the square.

10. The receiving array antenna system of claim 9, further comprising four feeder spoolers, each wound with a feed wire, wherein each feed wire is in electrical communication with one side of the horizontal loop antenna.

11. The receiving array antenna system of claim 1, wherein the receiving antenna array comprises multipolarized antennas.

12. The receiving array antenna system of claim 11, wherein the receiving antenna array of multipolarized antennas comprises:
two crossed loop antennas, orthogonal to one another, such that a first crossed loop antenna extends in a x-z plane, and a second crossed loop antenna extends in a y-z plane;
horizontal loop antenna surrounding the two crossed loop antennas and disposed in the x-y plane; and
a monopole antenna extending in a z direction.

13. The receiving array antenna system of claim 12, wherein each crossed loop antenna comprises: a first half loop, connected to one side of the housing at two terminals; and a second half loop, connected to an opposite side of the housing at two terminals.

14. The receiving array antenna system of claim 1, wherein the housing is disposed on a tower, balloon, or satellite.

15. The receiving array antenna system of claim 6, wherein the receiving antenna array comprises multipolarized antennas.

16. The receiving array antenna system of claim 15, wherein the receiving antenna array of multipolarized antennas comprises:
two crossed loop antennas, orthogonal to one another, such that a first crossed loop antenna extends in a x-z plane, and a second crossed loop antenna extends in a y-z plane;

horizontal loop antenna surrounding the two crossed loop antennas and disposed in the x-y plane; and a monopole antenna extending in a z direction.

17. The receiving array antenna system of claim 16, wherein each crossed loop antenna comprises: a first half loop, connected to one side of the housing at two terminals; and a second half loop, connected to an opposite side of the housing at two terminals.

18. The receiving array antenna system of claim 6, wherein the housing is disposed on a tower, balloon, or satellite.

19. The receiving array antenna system of claim 6, wherein the antennas are constructed from a metallic electrical conducting wire, a tubular material or a strip material.

* * * * *